(12) United States Patent
Schmidt et al.

(10) Patent No.: US 10,897,912 B2
(45) Date of Patent: Jan. 26, 2021

(54) VARIABLE CONTOURED ROUNDING BAR, DEVICE AND METHOD OF USING SAME

(71) Applicants: Norman Schmidt, Burnaby (CA); Adam Baran, Surrey (CA)

(72) Inventors: Norman Schmidt, Burnaby (CA); Adam Baran, Surrey (CA)

(73) Assignee: Food Machinery Engineering, LTD, British Columbia (CA)

( * ) Notice: Subject to any disclaimer, the term of this patent is extended or adjusted under 35 U.S.C. 154(b) by 0 days.

(21) Appl. No.: 16/245,254

(22) Filed: Jan. 10, 2019

(65) Prior Publication Data

US 2020/0221713 A1 Jul. 16, 2020

Related U.S. Application Data

(63) Continuation of application No. 15/724,260, filed on Oct. 3, 2017, now Pat. No. 10,306,896.

(60) Provisional application No. 62/403,839, filed on Oct. 4, 2016.

(51) Int. Cl.
*A21C 7/02* (2006.01)
*A21C 7/01* (2006.01)

(52) U.S. Cl.
CPC . *A21C 7/01* (2013.01); *A21C 7/02* (2013.01)

(58) Field of Classification Search
CPC .................................... A21C 7/01; A21C 7/02
See application file for complete search history.

(56) References Cited

U.S. PATENT DOCUMENTS

| 2,738,741 | A | 3/1956 | Rhodes |
| 4,008,025 | A | 2/1977 | Campbell |
| 5,714,178 | A * | 2/1998 | Keener .................... A21C 7/01 249/115 |
| 6,159,517 | A | 12/2000 | Watts et al. |
| 6,303,169 | B1 | 10/2001 | Ayash |
| 6,382,952 | B1 | 5/2002 | Cummins |
| 6,506,042 | B1 | 1/2003 | Watts |
| 6,616,439 | B2 | 9/2003 | Oki |
| 10,306,896 | B2 | 6/2019 | Schmidt |

FOREIGN PATENT DOCUMENTS

| DE | 1028952 B | 4/1958 |
| GB | 181189 A | 6/1922 |

* cited by examiner

*Primary Examiner* — James P Mackey
(74) *Attorney, Agent, or Firm* — Tangent Law Group, PLLC; Eric J. Weierstall, Esq.

(57) ABSTRACT

A rounding device and method of rounding that provides improved rounding of semi solid material portions by introducing changes or variations in the contours or profiles of rounding bars to produce two or more changes in the axis of rotation of the semi solid material portion through rapidly changing release sections along the working length of the rounding bars and round the surfaces of the semi solid material portion with greater uniformity and consistency. By substantially changing the axis of rotation of the semi solid material portion in the working length of the variable contour rounding bar as it passes through a rapid transition area one can improve the rounding and avoid blemishes and deformities that occur to the surface of the semi solid material portion in existing devices.

20 Claims, 10 Drawing Sheets

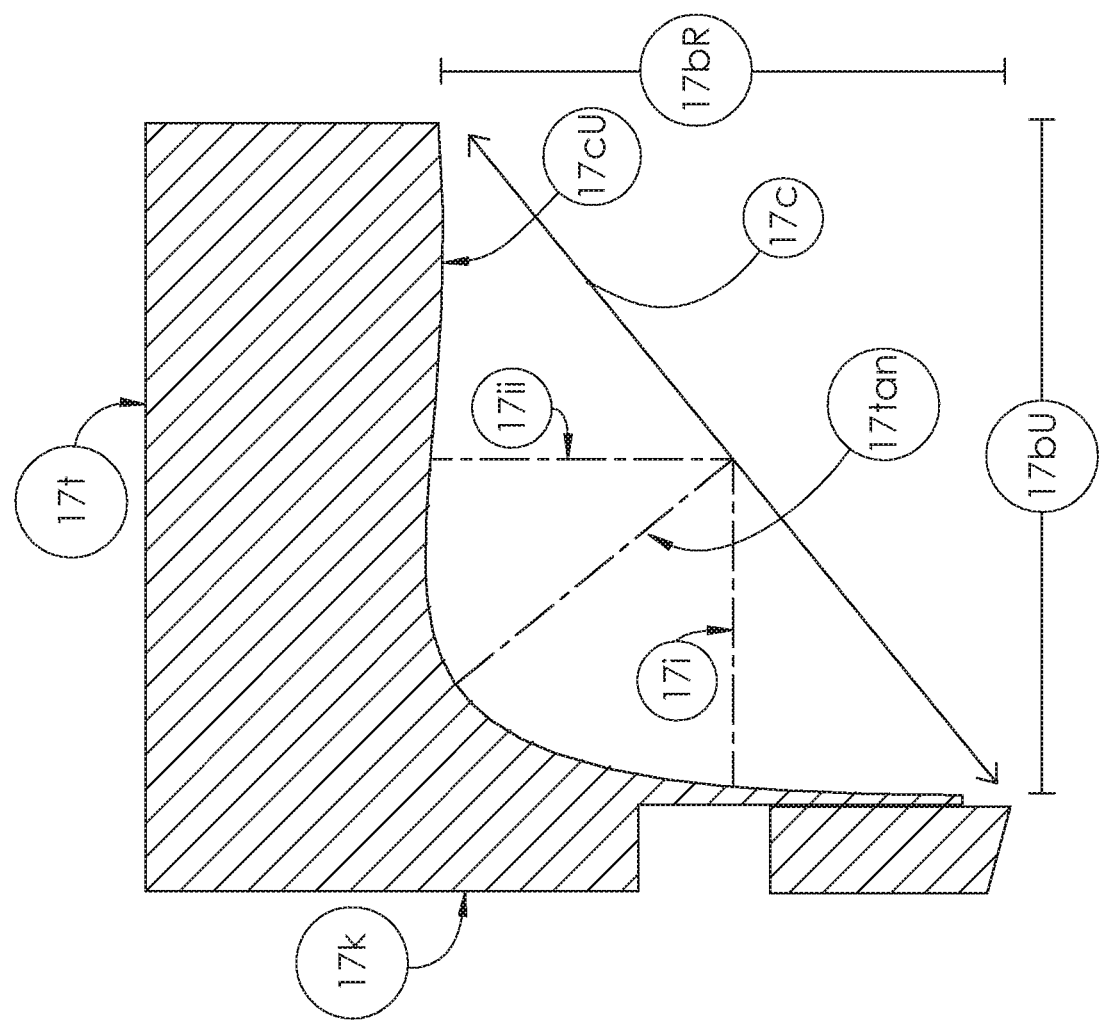

VARIABLE CONTOURED ROUNDING BAR, DEVICE AND METHOD OF USING SAME

CROSS REFERENCE TO RELATED APPLICATIONS

This application is a continuation of U.S. patent application Ser. No. 15/724,260 filed Oct. 3, 2017, which claims the priority of U.S. provisional patent application 62/403,839, filed Oct. 4, 2016, which are incorporated herein by reference.

FIELD OF THE INVENTION

The instant invention is directed to an improved, variable contoured rounder or rounding bar of the type typically used in equipment used to, but not limited to, round portions of dough or semi solid medium portions. By utilizing a rounding bar with a variable contour that changes along the working length of the rounding bar the invention is able to more effectively round portions of semi solid medium into a semicircular, round or spherical shape. A variable contour along the rounding bar, using a combination of intermittently changing contours, works the semi-solid medium portion or dough to round the semi solid medium at different orientations and along different axis of rotation to produce a better, more completely rounded semi solid medium portion.

BACKGROUND OF THE INVENTION

In the production of products made from semi-solid medium portions such as but not limited to dough for bread, pizza bases, rolls, tortilla rounds and the like, it is an important step in the production to shape a non-uniform, non-rounded portion into a spherical shape. It is significant that this production have a final product of consistent shape and outward appearance. As an example, when making pizza bases in commercial automated applications using a poorly rounded dough portion there is a high probability that the final product will be misshaped and its appearance may drop below acceptable characteristics in dimensions and workability, as a miss-shaped dough portion may not easily stretch out to a round pizza base and therefore needs manual labor intervention to correct the shape and size thereby adding costs and loss of production. There is also an issue with rounding blemishes that are prevalent on the dough portions created by some existing devices that can occur from the prior art devices conventional rounding such that when the dough portion is rounded it has a blemish on the surface of the rounded dough portion. One typical type of blemish will have the appearance of a "navel" on a Navel Orange, this blemish will create issues when the dough ball is stretched and worked to create the flat pizza base. When stretched this blemish will almost always leave a blemish in the surface of the pizza, in other cases it will cause or be the source of a tear in the pizza base. Other blemishes, such as creases, may also be formed by the contact.

With typical, prior art rounding devices or machines there is, at some point, at least one contoured bar which will be affixed at an angle to a moving surface. This can be, in some prior art devices, a bar that winds helically around the surface of a rotating truncated cone or vertical cylinder. As one example, this rounding operation will be based in part on the desired rounding effect imparted due to the change in relative surface velocity as the semi solid material goes from the typical inlet which may be at the small or large diameter end of the cone and is worked in a helical/diagonal path across the surface of the rotating cone to exit at the other end which will be opposite in size as compared to the size of cone as to where the semi solid material portion entered.

As an example of how such existing prior art machines operate in lower volume operations, a semi solid material portion may enter or be dropped to the inside of the bottom of a cavity containing a rotating inverted cone (where the smaller diameter of the cone is at the bottom and the larger diameter is at the top) which has a helical rounder bar, that is often referred to as a shoe, winding its way out from the internal bottom of this area. As the cone rotates it deflects or moves the semi solid material portion from the start of the helical wound rounder shoe where the semi solid material portion is captured between the surface of the rotating rounder cone and the helically wound rounder shoe. The semi solid material portion is entrained and travels at an angle to the path of the rotating cone as determined by the fixedly mounted helix of the rounding bar that is wound around the cone. This resultant diagonal movement of the semi solid material portion substantially encourages mechanically induced rotation of the semi solid material within the partially enclosed contour of the rounder shoe.

This mechanically induced rotation as well as compaction of the semi solid medium in the contoured area of the rounding bar and the moving surface of the cone shape provides a degree of rounding to the semi solid material. The rounder shoes in these devices are often of a continuous ever increasing or decreasing helical spiral. Issues with such cone rounders result because the cone provides a consistent surface of contact; although the curvature is changing due to the helical structure the uniformity of the contact surface is similar to providing a bar with a continuous effective contour. The result of this is that the semi solid material portion starts to rotate on a consistent axis of rotation to where there will be a point or area on the semi solid material portion that no longer receives any rounding action and therefore does not become better or more rounded.

In some cases be it for manufacture or operation there are rounder shoes that are made in multiple helical sections where the semi solid material portion travels and is rounded as it passes along the contour of a further rounder shoe section. When it reaches the end of a segment it departs from the exit end of the rounder shoe segment and enters into the entry point of the next segment of rounder shoe. In this gap and transition section the semi solid medium portion would perform an uncontrolled drop and change in its axis of rotation but still rotate in the same direction of rotation. This change in axis of rotation can improve the rounding effect of the rounder as it changes the surfaces or areas in contact with the contour of the rounding shoe as well as the surface of the rotating cone.

However, as the device utilizes the free fall of the semi solid medium portion dropping from segment to segment within the device its rounding is inconsistent. Though such a device may provide improved rounding, it does so in an uncontrolled, unpredictable, inconsistent fashion. The issue with such a process is that it is not a consistent process, where the varying size and shape of semi solid medium portion would inconsistently change the axis of rotation and therefore inconsistently alter the change of axis of rotation at the release and re-capture at a given location, essentially making the orientation after discharge from the first segment unpredictable and therefore the further rounding process harder to provide in a consistent manner.

Another issue or negative aspect of these types of rounding devices is that they are significantly fixed as to the path of the rounder shoe as the shoe was machined so as to match the surface of the cone and trying to change the path of the helical shoe to the cone would result in a poor fit to the cone. So it must retain whatever helical pattern the rounder came with and is limited to almost no changes or adjustments. A still further issue with these types of rounders is that they also have a running clearance or gap between the cone surface and the rounder shoe where small bits of dough come off of the dough portion as the dough portion travels through the rounding shoe. These small bits of dough slough or come off in the form of a non re-usable waste product and impact the resulting finished product by rendering them under weight.

In addition to the cone rounders, there also exists a type of rounder that uses a stationary cylindrical inner cylinder that has a helical grove cut into it that winds from bottom to top of cylinder. Around this inner cylinder rotates an outer cylinder. In operation the dough portion is dropped down the center of the stationary inner cylinder to the bottom of the device where the dough portion is directed to the entry point of the helical groove of the stationary inner rounding cylinder so that as the dough portion moves and engages the outer rotating cylinder the dough portion rolls up the helical passage way. Both this and the inverted cone design have a drawback in that the small fragments of dough that slough or shear off of the dough piece as it is acted upon by the helical shoe that is placed at an angle to the moving surface. In the case of the cylindrical rounders, these pieces typically fall to the bottom of the device where in subsequent dough portions pick them up and somewhat incorporate them into the other rounded dough portion, creating a portioning size problem. Again, as noted with most of the conical and cylindrical rounders, the control of the exact motion and axis of rotation are not predictable and there exist an issue with the sloughing and portion size control.

An additional and newer method of providing rounding is referred to as an "inline rounder" where a constantly contoured rounder bar is placed on an angle relative to the path of travel along a wide flat bed conveyor that has a conveyor belt running on it. Essentially it is a horizontal process on a conveyor system and thus differs from the conical and cylindrical systems in that the direction and nature of the forces are more easily controlled and they generate less waste. The semi solid material portion is dropped on the moving conveyor belt so that the moving conveyor belt presents the semi solid medium portion to the entry opening of the contoured rounder bar. The semi solid material portion then contacts the receiving opening end of the contoured rounder bar which starts the semi solid material portion into a rotation and the previously indicated rounding process occurs.

Existing inline rounder devices typically provide long, straight constant contour rounder bars set diagonally across the conveyor that are used to round portions of roll dough, for instance dough balls typically used to make hot dog and hamburger buns where dough was portioned in a simultaneous four or six across fashion and the dough portions drop drops onto the conveyor belt and proceed into four or six parallel rounder bars that go diagonally across the belt. An example of a prior art rounding machine of this type is described in U.S. Pat. No. 4,306,850, which discloses an inline rounder that has a biased flexible foot that helps to keep material from being lost between the rounding bar and the conveyor belt by maintaining continuous contact despite surface irregularities. A rounding bar with a consistent contour is shown. U.S. Pat. No. 6,382,952 discloses an inline rounder with rounding bar surface areas that have a non-occluding texture that reduces adherence of the semi-solid material portions to the rounding bar. In this patent the rounding bar is shown with enlarged entry and exit areas, and a working area that has a near consistent contour.

U.S. Pat. No. 5,714,178 also discloses an inline rounder and it is also directed to textured features to minimize material adherence to the rounding bar. This patent shows a gradual taper from an entry area to a compression area, and then another gradual taper to an exit area. Such a gradual taper results in a corresponding gradual and slight change or wobble in the axis of rotation such that after rolling against the rounding bar, there can still be creased areas, blemishes such as three point blemishes and un-rounded non-contact areas on the surface of the semi-solid material portion. Although the inline rounder provides a potential improvement over the previous rounding processes and greatly reduces the sloughing issues, the inline rounding process never provided the complete solution that was desired in the industry.

As an example of the continuing issues that produced less than desired rounding, one can look at a portion of pizza dough which is rounded using devices utilizing this process. In this rounding procedure the dough portion gets rounded by either a cone rounder or an inline rounder that basically allows for or encourages the dough to be rounded about one axis of rotation and to rotate in one direction only. To significantly change the axis in existing constant contour, a shift from one rounder bar to another would be required, but this solution is problematic.

This change of axis can be accomplished by using more than one rounder bar in a sequentially opposed pair at opposite deflection angles, side loading is minimized and rounding is increased as there is more than one pass at rounding. However, adding these additional bars requires larger, longer devices, additional belts and orientation of the further bars in a mirror opposite configuration to balance out the side loading and provide the additional pass of rounding and suffers from the same inherent inconsistencies of the helical rounders with the spaces between rounder shoes. In either instance, whether single or multiple passes, the resulting rounding of the dough or semi-solid material balls remains inconsistent and insufficient as the portions have spun or rotated about substantially a single axis while rounding against a relatively constant contour bar or bars and consistency in rounding and blemishes remain ever present issues.

Prior art devices typically provide two constant or consistent profile rounder bars where the first rounder bar would provide a rounding operation to the semi viscous medium portion and upon exit from the first rounding bar the semi viscous medium portion would communicate or proceed to the second rounding bar so that additional rounding can be performed on the semi viscous medium portion. To provide for this the first rounder bar would be set at an angle diagonal to the direction of the movement of the conveyor and the second rounder bar opening in line with the exit point of the first rounder bar but at an opposite diagonal angle to the direction of the movement of the conveyor belt where the semi solid material portion would be rounded by going diagonally across the flat bed conveyor only to reach the end of the contoured rounder bar and be released and be recaptured by the second rounder bar shoe so as to continue in the opposite direction across the surface of the flat bed conveyor.

Though this provides for a capture and then release and recapture of material when going from one continuous contour rounding bar to the next and would thereby change the axis of rotation of the semi solid medium portion imparted by the first continuous profile rounding bar when going from bar to bar, just like the segmented helical systems, but this change is still uncontrolled over this long release going from one continuous contour rounding bar to the next. For example, though additional rounding by the second continuous contour rounding bar on some areas of the dough piece or semi solid material that were not rounded previously on the first continuous contour rounding bar may be provided, the solution offered in adding a second consistent contoured rounding bar is limited in that the axis of rotation is changed a very limited number of times and randomly in an uncontrolled release from one continuous contour rounding bar to the next. The length of the conveyor is typically restricted and a single additional pass on the additional continuous rounding bar is typically insufficient to address the issues of blemish formation and the like and may increase the likelihood of development of certain blemishes and imperfections. The rounding is also still incomplete with respect to the areas not fully rounded on contact with the second bar. And similar to the prior art helical and cylindrical rounders, the drop from first to second continuous or constant contour rounder bar is uncontrolled and random.

This is understandable as the rounder bar contour does not fully encapsulate or contact all surfaces of the semi viscous or semi solid material portion as it is rotating through a single change of axis in this prior art two continuous contour rounder bar device. As the portion rotates on the second continuous contour rounder bar there will be still be some area that is outside of the area of contact of the rounder bar and moving conveyor belt—this area will receive no rounding action due to the constant profile and singular axis of rotation. A blemish or partial blemish on a spot on the dough portion can occur from over exposure on the single axis of rotation, as it does on the single axis of rotation on a first continuous contour rounder bar. This is typical of the single pass and the multi-pass constant contour rounder bars only increase the likelihood as they provide a longer duration of rounding on a single axis associated with the bar.

Thus these inline rounder devices with multiple constant contour rounder bars have the same drawbacks as the prior art devices, principally a single or very limited number of changes of the axis of rotation based on the overall number of bars and the uncontrolled realignment of the dough or semi solid material portion relative to the bar on each portion that passes through the device. Additionally, the over exposure of the portion to a single axis of rotation, whether on the first or second rounding bar, is more likely with the constant profile bar and the additional bar does not necessarily mitigate and may actually increase the risk of this happening. Overall, the result is incomplete, unacceptable, unpredictable variations in the quality and consistency of the rounding on the portions.

In addition, it is difficult to adjust the rounding bar or bars in these devices to accommodate different dough. Typically to perform correctly rounding bars need to be matched to the needs or constraints of the semi viscous material portions being rounded. These include the size of rounding bar which must be matched to the size of the portion as well as viscosity and roundability of the material. Very stiff material can need to get more work added to it during rounding so as to round better as compared to a soft material where minimal work and/or deformation produces adequate rounding. Roundability is a complex variable incorporating multiple material characteristics and can be described as how the material reacts to rounding and working forces. These variables can include viscosity, the Newtonian nature of the material, and other material and environmental characteristics that make the material more or less responsive to the rounding and working forces. As a general rule softer materials are easier to round or respond faster to rounding forces than stiff materials and can therefore be said to have greater roundability. However, stiffness is only one measure of roundability. Generally, the highest roundability, that is the degree of responsiveness to rounding or working forces, in semi-solid materials can be found in soft, Newtonian materials, these react very quickly and easily to rounding and working forces. Further, stiffer, Newtonian materials require greater application of rounding and working forces to achieve the same effects. More so, stiff, non-Newtonian materials will require the greatest amount of force to achieve a result, thus being of low roundability. Additionally, and especially with non-Newtonian semi-solid materials, the amount of work may be varied by the speed at which the forces are applied. These and other characteristics of the material define roundability.

As a non-limiting example of some of the complex factors that determine roundabilty, materials that are only lightly mixed where the materials do not have a strong or developed cohesive bond, if too much work is performed or too much of a deformation force is applied then these materials can crack and or fracture, and these can be referred to as having a low roundability, e.g. they do not respond easily to rounding forces. But otherwise if the material is even lightly mixed will deform fairly easily and will follow a standard that for the material to move or deform it is proportional to the work or deforming energy put into it, this proportional work to deformation aspect tends to classify the material as being a Newtonian fluid or material. And if the material has good cohesion and easily deforms then it could have even better roundability even if only lightly mixed.

As a further non-limiting example of variations in roundability, materials that are significantly mixed or well mixed to where they will show an exponential resistance to deformation due to deformation stresses put upon them and would therefore be a non-Newtonian fluid or medium, by comparison to a brittle or fragile material portion, the significantly mixed material would have a greater roundability than the brittle or fragile material portion but lesser roundability than a soft, cohesive, Newtonian semi-solid material portion. An example is bread or roll dough where when it is being worked upon it first gets stiffer or resists further work and the faster you add work or deformation to the dough the more it resists this addition of work by stiffening up, but when the material is no longer subjected to work it will soften up, this is typical of a non-Newtonian fluid. The strongest example of non-Newtonian fluid is silly putty, where when you put it on a flat surface it will flow but if you take a ball of it and drop it onto a hard surface it will bounce back and to very close to its original height so as to show that it has not absorbed much energy. In either case the shape, contour, size and like variables of the contour or profile of the rounding bar needs to vary or be adjusted to suit the material to be formed.

Several additional reasons or contributing factors in the rounding process of semi-solid materials can result in non-optimal rounding. Returning to the non-limiting example of pizza dough portions being rounded by continuous contour rounder bars some, but certainly not all, factors that contribute to results that are not optimally rounded can include that the facility or the line where the pizza dough portions are made will need to produce pizza dough portions of varying sizes and thus need to adjust for changing portion sizes. For instance six inch diameter thin crust pizza rounds compared to fourteen inch diameter thick crust round portions all differ in weight or dough mass and so there diameter will change with pizza size and thickness. Therefore the rounding bar contour size will need to be matched to the size of the pizza dough portion. Differing materials in pizza dough are often also used and this changes the stiffness of the dough which in turn changes variables that effect the rounding efficiency, for instance but not limited to stiff dough, soft dough, whole wheat verses white dough types, where no one setting or adjustment of contoured rounder shoe angle to the moving conveyor belt will suit all products. And that variability only within a single dough type. Variations in other semi solid materials compound this complexity. Compensating for these variables in prior art devices requires different and/or changing components or entire devices, which adds to costs in accommodating these variables. Further the prior art allows for minimal adjustment of the variables if any in the devices. These variables are thus not managed well by the prior art process noted above or any other processes to date.

Therefore a need exists to provide rounding bars that are easily tailored to specific dough or semi-solid material rounding, that have varying, e.g. non-consistent, contours so that the axis or rotation of the dough or semi-solid material portion or ball will change during the passage of the portion from entry point to exit point of the rounding bar. This new, non continuous or variable contour rounding bar, device and rounding process will result in more consistent rounding with improved control of the axis of rotation and the duration of rounding throughout the changing axis of rotation so as to overcome the rounding deficiencies of the prior art continuous contour rounder bar and multiple rounding bar devices. The variable contour rounding bar should also be easily removed and replaced as needed and/or adjusted as well to accommodate a wider variety of materials and setups.

SUMMARY OF THE INVENTION

An aspect of the invention is to provide a rounding device with a rounding bar that has one or more profile or contour changes that force one or more changes in the axis of rotation of a dough or semi-solid material throughout the length of the rounding bar.

An aspect of the invention is to provide an inline rounding device having a non-consistent or varying contour rounding bar such that the non-consistent or varying contour or profile of the bar varies to induce one or more of the physical forces used to work the dough or semi-solid material and the physical properties of the dough.

A further aspect of the invention is to provide an inline rounding device having characteristic profile changes providing areas of compression and relaxation to work the dough and change the orientation of the dough.

A yet further aspect of the invention is to provide an inline rounding device with multiple non-consistent contour or profile rounding bars working in lanes to provide higher input and output volumes.

A still further aspect of the invention is to provide an at least one rounding bar having a varied or non-consistent profile along the length of the bar and providing at least one change in the axis of rotation of a dough or semi-solid portion being impacted against the bar.

Yet another aspect of the invention is to provide an at least one rounding bar having a varied or non-consistent profile such that collision rods or rods or elements are provided and the non-consistent profile together with the collision rods provide one or more changes in the axis of rotation of a dough or semi-solid portion impacting the bar.

An aspect of the invention is a rounding bar having a non-consistent or varying profile or contour varying at least one of a radius, arc, long chord length, curvature, concavity, convexity, degree of curvature, points of tangency, points of reversal, lip height, roof length, wall height, tapering, bearing distance, pitch or the like.

A further aspect of the invention is a rounding bar having a non-consistent or varying profile or contour varying the profile or contour based on an at least one physical property of the dough or semi-solid material processed by the rounding bar.

The invention includes an apparatus, a method for operating the apparatus, and a method of manufacture.

The apparatus of the invention includes a semi-solid media rounding device transporting and rounding an at least one semi-solid material portion, having an at least one conveyor belt mounted to and moving above a conveyor bed in a direction of travel and an at least one variable contour rounding bar coupled to a frame and aligned above the conveyor belt with an entry area and an exit area and having a variable contour on the at least one variable contour rounding bar, the variable contour being non-uniform along an at least one working area on a working length of the at least one variable contour rounding bar, wherein when the semi solid portion of material is moved in the direction of travel on the conveyor belt it impacts the at least one variable contour rounding bar starting at the entry area, the at least one semi-solid portion of material is moved along the length of the variable contour into the at least one working area of the at least one variable contour rounding bar the movement imparting an axis of rotation and the variable contour imparting an at least one substantial change in the axis of rotation at different positions along the working length of the at least one variable contour rounding bar, the semi-solid portion being rounded by the movement until it progresses out of the exit area of the at least one variable contour rounding bar as a rounded semi-solid media portion.

The device can further include a second axis of rotation imparted on the semi-solid portion after the at least one substantial change in the axis of rotation, whereby the axis of rotation varies from said axis of rotation to the second axis of rotation such that a non-contact area of said semi-solid portion that was not in contact with said rounding bar or said conveyor belt when said semi-solid material portion was moving about said axis of rotation is oriented to be in contact with at least one of said rounding bar and said conveyor belt when said semi-solid material portion is rolling about the second axis of rotation. The variable contour can further include an at least one relaxation area spanning between two compression areas within said working length, with said relaxation area having a larger open cross-sectional area than that of each one of said compression areas. The variable contour of the at least one variable contour rounding bar can impart two or more changes of the axis of rotation of the semi-solid portion along the working length of the variable contour rounding bar. The variable contour of the device can vary in at least one of radius, arc, long chord length, curvature, concavity, convexity, degree of curvature, points of tangency, points of reversal, lip height, roof length, wall height, tapering, bearing distance, pitch, and the like.

The at least one variable contour rounding bar can form an angle of deflection relative to the direction of travel. The angle of deflection can be adjustable. The at least one variable contour rounding bar can form an angle of inclination relative to the at least one conveyor. The angle of inclination is adjustable. The at least one variable contour rounding bar can form an angle of inclination relative to the direction of travel. The angle of inclination can be adjustable. The at least one variable contour rounding bar can form an angle of tile relative to the conveyor belt and the angle of tilt is adjustable.

The device can further include an at least one collision rod, the at least one collision rod is placed so as to impact the at least one semi-solid portion as it moves along the length of the at least one variable contour rounding bar. The at least one variable contour rounding bar can form an angle of deflection with the conveyor belt and can further comprise a further at one variable contour rounding bar in an opposed angle of deflection relative to the at least one variable contour rounding bar. An at least one collision rod can also be placed so as to impact the at least one semi-solid portion as it moves from the at least one variable contour rounding bar to the further at least one variable contour rounding bar or contour shaping element.

The rounding device further including an angle of deflection formed by the at least one variable contour rounding bar relative to the conveyor belt and wherein the at least one variable contour rounding bar further comprises a further at least one variable contour rounding bar, the further at least one variable contour rounding bar being parallel to the at least one rounding bar and therefore having the same angle of deflection The at least one rounding bar and the further at least one rounding bar can form a first set of rounding bars. The device can further include a second set of rounding bars which follows the exit from the first set of rounding bars and is oriented as mirror opposite the first set of rounding bars angle of deflection.

The at least one variable contour rounding bar variable contour can exert an at least one compression dough working force in a compression portion of the variable contour of the at least one variable contour rounding bar. The at least one variable contour rounding bar variable contour can exert an at least one relaxation semi solid or dough working force in a relaxation portion of the variable contour of the at least one variable contour rounding bar. The at least one variable contour rounding bar variable contour can exert an at least one compression semi solid or dough working force in a compression portion of the variable contour and an at least one relaxation semi solid or dough working force in a relaxation portion of the variable contour of the at least one variable contour rounding bar.

The rounding device can further include an at least one attachment element coupled to an at least one mounting bar which is coupled to the at least one variable contoured rounding bar. The at least one attachment element can releasably couple the at least one mounting bar to the at least one variable contoured rounding bar in the rounding device. The two or more changes in the axis of rotation imparted on the semi-solid portion along the working length of the variable contour rounding bar can be directly dependent on the size of the semi-solid portion.

The article of the invention includes a variable contour rounding bar having a variable contour that receives portioned pieces of a semi-solid material for rounding, said variable contour rounding bar having a rounding area that receives said semi solid material propelled against the variable contour rounding bar, the propulsion of the semi-solid material imparting an axis of rotation and the variable contour of the variable contour rounding bar imparting an at least one change in the axis of rotation at different positions along a working length of the at least one variable contour rounding bar.

The variable contour rounding bar can have an entry area at a leading edge of said variable contour rounding bar, said entry area having a larger cross sectional open area at said leading edge compared to a cross sectional area of said rounding area, with the larger cross-sectional area of the entry section smoothly tapering to the smaller cross-sectional open area of said rounding area. The rounding area can further include a first rounding area and a second rounding area and an at least one collision rod fixedly positioned between said first and second rounding areas.

The first rolling section and said second rolling section can be part of a plurality of rounding sections linearly spaced along said rounding area, whereby said semi-solid media is rounded around more than two axis of rotation. The first rolling section of the plurality of rolling sections can be next to the leading edge of said variable contour rounding bar and has a length that is longer than that of a last rolling section of the plurality of rolling sections that is next to a trailing edge of said variable contour rounding bar. The first rolling section of the plurality of rolling sections can also be next to the leading edge of said variable contour rounding bar and has a length that is shorter than that of a last rolling section of the plurality of rolling sections that is next to a trailing edge of said variable contour rounding bar. The plurality of sections can have a wave pattern when viewed from the side of said rounding bar. The plurality of sections can have a steep change in the variable contour from a first rolling section to a further rolling section, whereby an abrupt release and relaxation of the forces accompanies the steep change in the variable contour while still being moved by the conveyor and constrained by the bar resulting in the at least one change in the axis of rotation of said semi-solid media.

The article can further comprise a variable contour rounding bar having at least one change in the contour of the variable contour rounding bar along the working length of the at least one variable contour rounding bar. The at least one change in the contour further provided at a working area along a working length of the variable contour rounding bar. Where the at least one change in contour further correlates to a change in the axis of an at least one semi solid material portion.

The method of the invention includes a method of rounding semi-solid material portions on a variable contour rounding bar having a variable contour, comprising the method steps of: propelling a metered semi solid material portion on a moving surface engaging the semi-solid material portion to impact into the variable contour rounding bar such that a first of an at least two angles or axes of rotation is imparted on the semi-solid material portion relative to the rounding bar and the rapid transition section of the variable contour of the rounding bar changes the first axis or angle of rotation at least to a second axis or angle of rotation in a working length of the rounding bar; and rounding the semi-solid portion into a rounded semi-solid portion.

The method step of engaging the semi-solid portion to impact into the variable contour further includes impacting the semi-solid portion with the variable contour to form an at least one compression working force in a compression portion of the variable contour rounding bar. The method step of engaging the semi-solid portion to impact into the variable contour further includes impacting the semi-solid portion with the variable contour to form an at least one relaxation working force in a relaxation portion of the variable contour rounding bar. The method step of engaging the semi-solid portion to impact into the variable contour further includes impacting the semi-solid portion with the variable contour to form an at least one compression semi solid or dough working force in a compression portion of the variable contour and an at least one relaxation semi solid or dough working force in a relaxation portion of the variable contour of the at least one variable contour rounding bar. The variable contour varies in at least one of radius, arc, long chord length, curvature, concavity, convexity, degree of curvature, points of tangency, points of reversal, lip height, roof length, wall height, tapering, bearing distance. The variable contour has an at least one rapid transition section.

Moreover, the above aspects and advantages of the invention are illustrative, and not exhaustive, of those which can be achieved by the invention. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. Thus, these and other aspects and advantages of the invention will be apparent from the description herein, both as embodied herein and as modified in view of any variations which will be apparent to those skilled in the art.

BRIEF DESCRIPTION OF THE FIGURES

Exemplary embodiments of the invention are explained in greater detail by way of the drawings, where the same reference numerals refer to the same features.

FIGS. 4B and 4C shows cross sectional views along lines I-I and II-II respectively of the variable contour rounding bar of FIG. 4A.

DETAILED DESCRIPTION OF FIGURES

Figure 1:
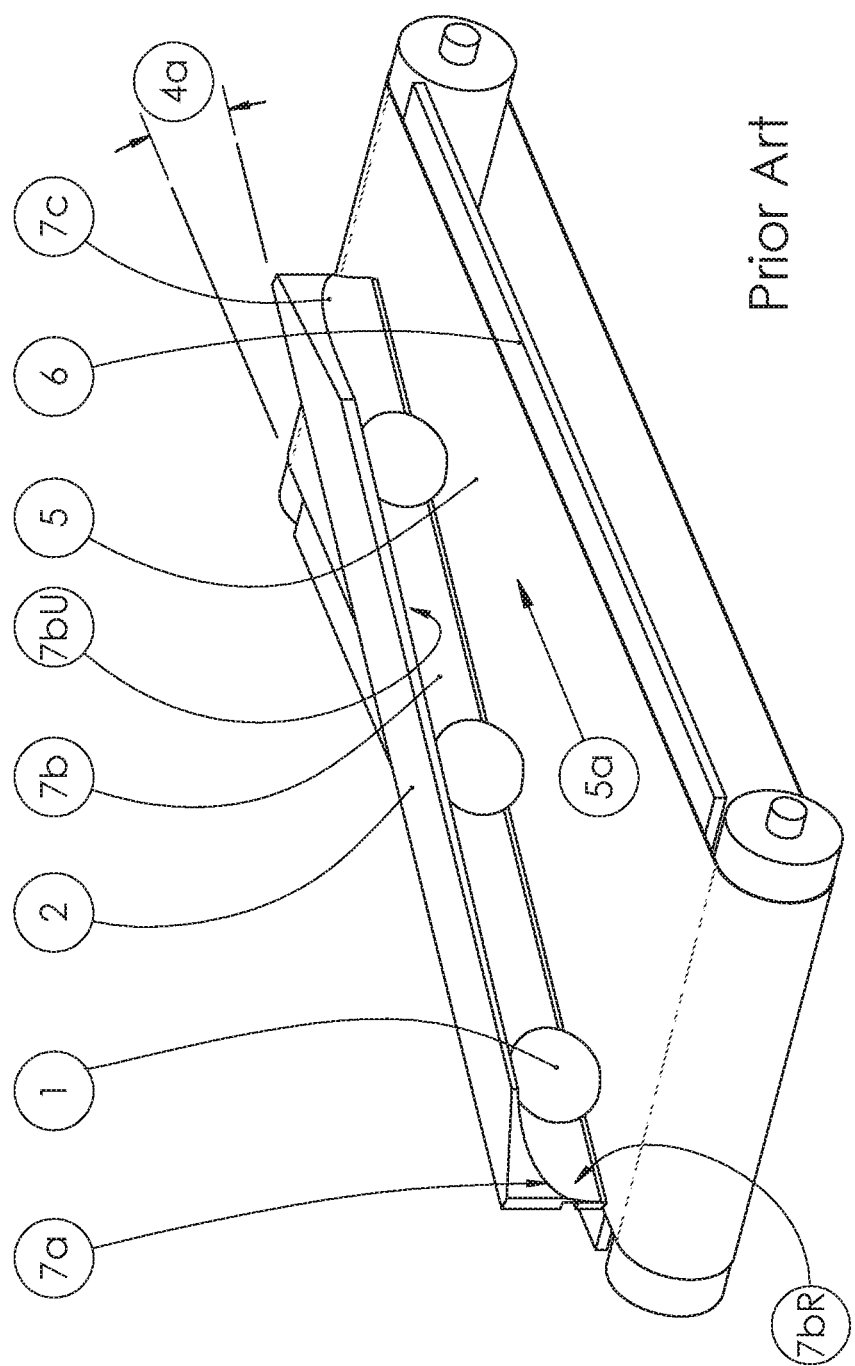
FIG. 1 shows an isometric drawing of a typical prior art rounder device.

FIG. 1 shows an isometric drawing of a typical prior art rounder device. The embodiment of FIG. 1 provides a single typical consistent contour rounder or rounding bar 2 set at a rounder bar deflection angle 4a across the path of a moving conveyor belt 5 which runs upon rigid flat surface of conveyor bed 6 in a direction of travel 5a. A semi solid medium portion 1 is typically cut from a large mass of semi solid material by a machine which will cut a piece of the mass of the semi solid material into a specifically sized portion that is not round and has edges and corners. This can be for example, but is certainly not limited to, a cylindrical portion issuing from the portioning device which can be extruded from a round opening and then cut so as to deposit onto the conveyor belt 5 just in front of the continuous contour rounder bar entry area 7a which can have a cut back opening as shown or can be bell or funnel shaped where this entry contour of continuous contour rounder bar 2 profile or contour will optimize catchment of the semi solid medium portion 1 as it is deposited onto and carried forward on conveyor belt 5 to this rounder bar entry area 7a. The semi solid medium portion 1 progresses from the entry area 7a and proceeds to a working area 7b which has a continuous profile or contour on a continuous contour rounder bar 2. The contour of the continuous contour rounder bar 2 is a bounded curve constrained by the upper roof area 7bU and the back surface 7bR, as better shown and described in relation to FIG. 2 herein below.

It is typical in the operation of the prior art rounder device in FIG. 1 that there are a series of semi solid medium portions 1 in passage simultaneously along the length of the standard, continuous rounder bar 2 with its continuous profile so as to facilitate higher production rates. It should also be noted that the contour of this continuous contour rounder bar 2 is typically kept at a constant contour in that it maintains the same contour shape for the length of the rounder bar 2 rounding area 7b, which defines the working length for the major portion or major length of the continuous contour rounder bar 2. The only deviations to the constant contour occur at the rounder bar entry area 7a and the rounder bar exit area 7c where the semi solid medium portion 1 enters and exits, respectively, from contact with the continuous contour rounder bar 2.

Figure 2:
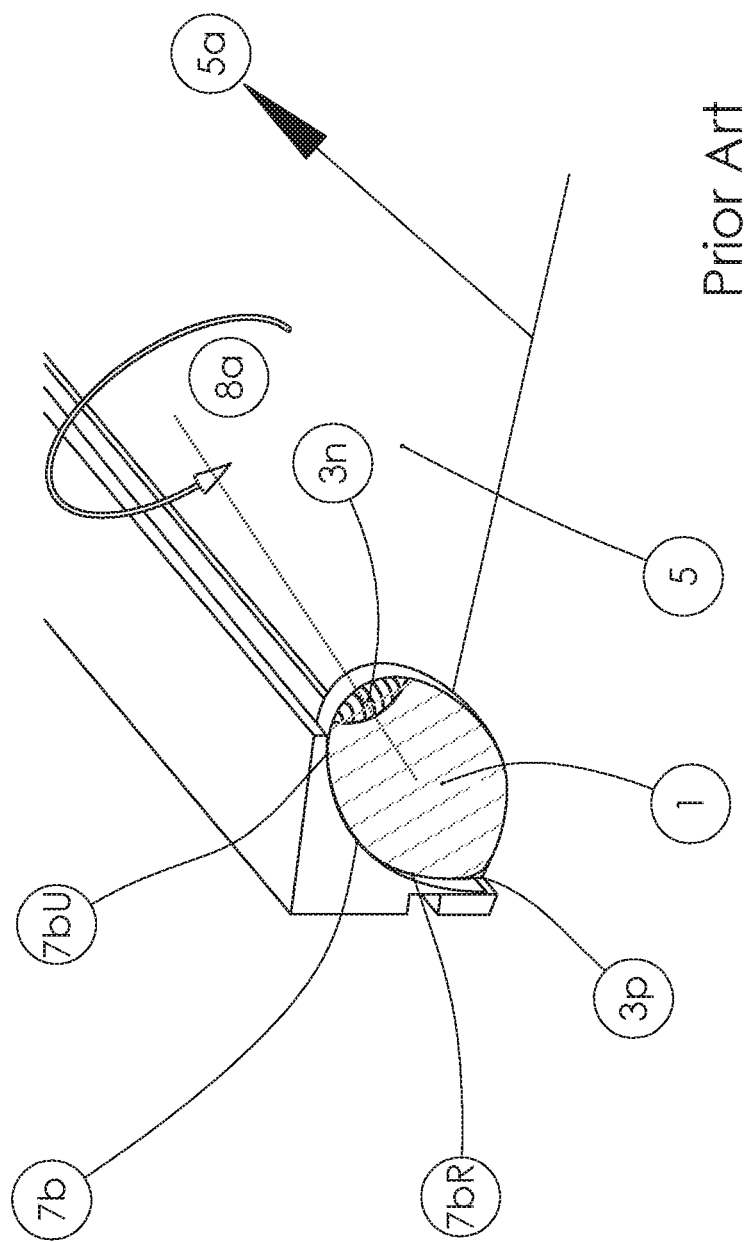
FIG. 2 shows an isometric view of a cut away section of a prior art continuous contour rounder bar with a semi solid medium portion rotating about a continuous axis of rotation.

FIG. 2 shows an isometric view of a cut away section of a continuous contour rounder bar with a semi solid medium portion rotating about a continuous axis of rotation as it is being rounded through the movement of the dough rounding conveyor belt pushing the semi solid medium portion 1 up against and therefore along the prior art continuous contour rounder bar 2. As seen in FIG. 2, a standard continuous contour rounder bar 2 is provided having a continuous contour profile with semi solid medium portion 1 partially contained within the area bounded by the continuous contour of the rounder bar rounding area 7b and the surface of the moving conveyor belt 5 so that the semi solid medium portion 1 is being worked through at least one of compression, rolling, or deformation so as to produce a rounded semi solid medium portion 1.

This combination of deformation and rolling will occur due to the motion having combined induced velocity vectors created by the contact of the semi solid medium portion 1 with the upper or roof area 7bU of the continuous contour rounder bar 2, back surface 7bR of the continuous contour rounder bar 2 and the moving conveyor belt 5 pushing along the rounding area 7b the semi solid medium portion 1 in the direction of travel 5a. This contact creates the velocity vectors along the angle which imparts rotation at an axis 8a. Thus deforming or working of the semi solid medium portion 1 as it rotates about the axis 8a. This will then tend to impart a rounding effect on the semi solid medium portion 1 by starting to develop the spin or rotation of the semi solid or semi viscous medium portion 1 about the constant axis of rotation or axis of rounding 8*a*.

An issue with this constant axis of rotation 8*a* in this process of rounding is that after a few revolutions of the semi solid medium portion 1 added rotations or revolutions do not improve the rounding action imparted on the semi solid medium portion 1. This is because the semi solid medium portion axis of rotation 8*a* never changes so that any areas that are not in contact with the conveyor belt 5 or the rounder bar 2 in rounding area 7*b* as the portion rotates about axis 8*a* will not receive any added rounding action. As such, whatever rounding of the semi solid medium 1 that has been produced will not be added to or increased after the first few revolutions in most cases.

There is also an area of the semi solid medium portion 1 that through its rotation due to the resultant constant axis of rotation 8*a* will never be in contact with any surface of the continuous contour rounder bar 2 or conveyor belt 5, so that this non-contact area 3*n* will not receive any rounding and therefore will remain as shaped from the previous portioning operation. Typically, this non affected or non-rounded area 3*n* will consist of the portion of the semi solid medium portion that extends radially about the area atop the rotating semi solid medium portion. There is also another area at the bottom area of the rounder bar rounding area rear or back surface 7*br* where it meets the conveyor 5 that will produce a blemish to this interface area 3*p* because of the continuous rotating interface to the semi solid medium portion 1 where the said blemish will occur and appear much the way a navel appears on a navel orange. The blemish 3*p* can also be referred to as a triple point blemish due to the convergence of the conveyor belt surface 5, the axis of rotation 8*a*, and the back of the contour of the constant contour rounding bar 2.

Figure 3:
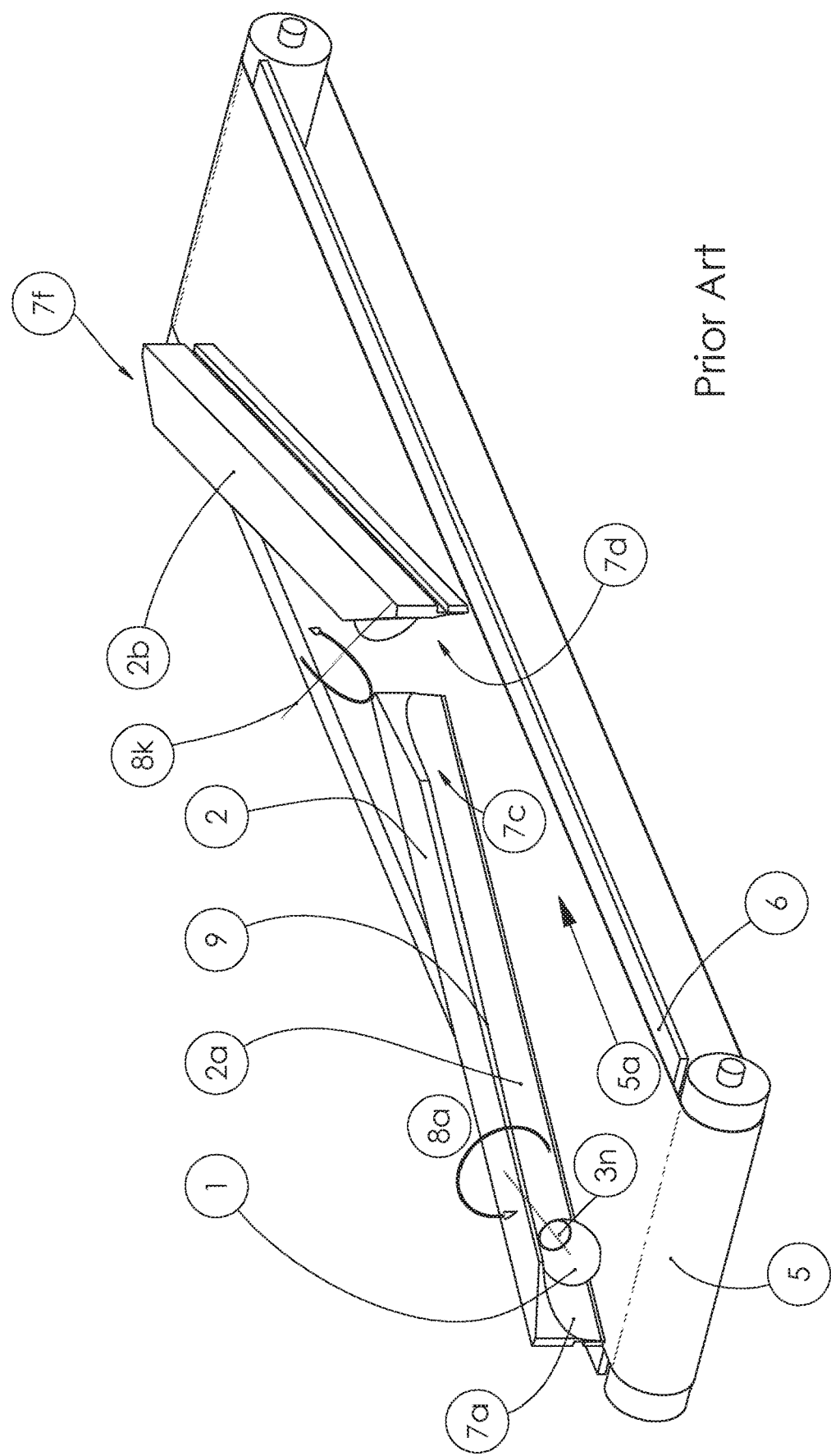
FIG. 3 shows an isometric view of a further prior art rounder device having a single lane rounder machine with two continuous contour shape rounder bars.

FIG. 3 shows an isometric view of a further prior art rounder device having a single lane rounder machine with two continuous contour shape rounder bars. The first continuous contour rounder bar 2*a* provides a rounding action as the conveyor belt 5 moves in its direction of travel 5*a* and the portion 1 is spun on a first axis of orientation 8*a*, as shown by the axis and rotation arrow similar to that shown in FIG. 1. As the conveyor 5 drives the semi solid medium portion 1 along the continuous contour rounder bar 2*a* from left to right in FIG. 3 this rotation acts to provide rounding about the one axis 8*a*, as discussed above in relation to FIG. 1. As the semi solid medium portion 1 rolls along the continuous contour rounder bar 2*a* the area forms a non rounded circumferal area 3*n* as previously discussed which is consistently untouched throughout the length of the rounder bar 2*a* and the navel like deformation triple point blemish 3*p* is also formed.

When the semi solid portion 1 exits from the end or exit 7*a* of first continuous contour rounder bar 2*a* the semi-solid medium portion 1 will then pass into the entry area 7*d* of the second continuous contoured rounder bar 2*b* where it will re-orientate itself after an uncontrolled roll or fall from the first rounder bar 2*a* to the second rounder bar 2*b*. The motion imparted by this drop to a second continuous contour rounder bar 2*b* in turn will rotate the portion in an opposite rotation as compared to its first direction of rotation on the first rounder bar 2*a*, indicated about an axis of rotation 8*a* via the arrow shown, and at a different axis of rotation 8*k* through the exit 7*f* to provide for added rounding over the previous device prior art continuous single bar rounding of the prior art embodiments of FIGS. 1 and 2.

The shortcomings of these prior art rounding devices and methods of FIGS. 1-3 comes from the use of the continuous contour rounder bar 2, 2*a*, 2*b* where for the majority of the travel along the bar the semi solid medium portion 1 can only attain rounding to a certain surface area and this cannot change as the semi solid medium portion never changes the axis of rotation 8*a* on which it is being worked and therefore can only affect certain areas of the semi solid medium portion that will come in contact within the continuous profile rounder bar rounding area 7*b* with the rounder bar rounding area rear 7*b*R and rounder bar rounding area upper area 7*b*U. The lack of deviations or changes in the profile results in a continuous axis 8*a* of rotation during rounding. An attempted resolution to this is to provide multiple continuous bars, as discussed above and shown in FIG. 3. Furthermore, the uncontrolled, unconstrained nature of the change in the axis of rotation results in differences in the rounding provided each portion, as the lengthy movement or fall from one continuous contoured rounding bar to the other results in an inconsistent positioning of the portion on the second bar. A device, such as the instant invention, that allows for consistent and controlled changes in the axis of rotation along the working length of the bar is required to achieve the consistent, controllable results needed to achieve improved rounding of the dough or semi-solid material portion.

Figure 4A:
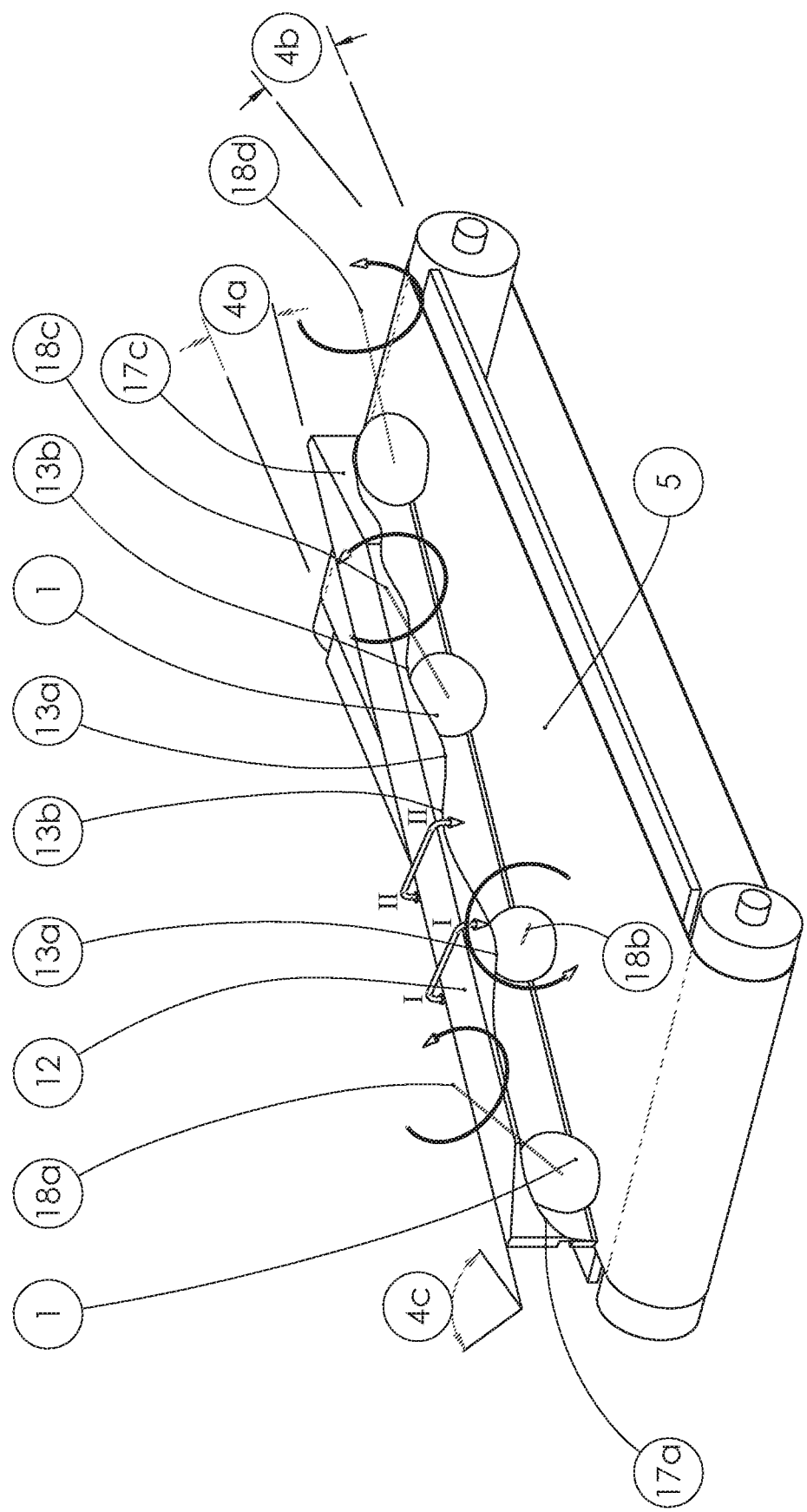
FIG. 4A shows an isometric view of an exemplary embodiment of the invention having a variable contour rounder bar mounted diagonally across the path of a moving conveyor belt.

FIG. 4A shows an isometric view of an exemplary embodiment of the invention having a variable contour rounder bar mounted diagonally across the path of a moving conveyor belt. As seen in the isometric view of an exemplary embodiment of the instant invention in FIG. 4A, a variable or non-consistent contour or profile rounder bar 12 is placed diagonally atop and across the path of the moving conveyor belt 5 at an angle of deflection 4*a* and an angle of inclination 4*c* relative to the conveyor belt 5. Angle of deflection 4*a* is measured in a plane defined by the surface of conveyor belt 5, which is the horizontal plane when tilt angle 4*b* is zero. Tilt angle 4*b* is the angle of conveyor belt 5 relative to the horizontal plane, and tilt angle 4*b* is typically zero, though other angles are possible. Angle of inclination 4*c* is measured in a plane perpendicular to the surface of conveyor belt 5 and indicates the inclination of rounder bar 12 from a perpendicular orientation relative to conveyor belt 5*b* relative to the conveyor belt 5. In the variable contour rounding bar 12, the working length has various working areas 13*a*, 13*b* that impart forces on the semi-solid material. The variable contour rounding bar 12 having these contour variations in rounding areas 13*a*, 13*b* throughout the working length of the variable contour rounding bar 12. The contour in the rounding or working areas varies in, for example but certainly not limited to, at least one of the height above the conveyor belt, the depth from the back surface to the top surface 17*b*R, 177*b*R, the length as measured along the surface of the bar 17*b*U, 177*b*U, and the variation in the shape of the contour or curve of the contour as one proceeds along the length of the variable contour rounding bar 12, as discussed herein in greater detail and better shown in relation to FIGS. 4B and 4C. One non-limiting example of the variation in the shape for instance would be a variation of a radius of curvature of the shape or profile of the bar or a varying radius of curvature throughout the length of the rounding area 13*a* on the variable contour rounding bar 12 in relation to the conveyor belt 5.

It should also be noted that as the semi solid material portion 1 moves along the length of the variable contour rounding bar 12 that the heights, lengths and depths of the contours can be changing as well as the curvature together or in isolation of one another. Also it is often the case that as the semi solid portion 1 goes along the variable contour rounding bar 12 that the need for or the degree of rounding required may be decreasing and therefore the magnitude of changes may decrease but still there must be changes in the axis of rotation so as to avoid creation of the triple point blemish 3p and avoidance of creation of the circumferential area 3n of FIGS. 1-3 and the degree of variation may be adjusted.

As can be seen in FIG. 4A the semi solid medium portions 1 are traveling along the variable contour rounding bar 12 and the changes in the variable contour of the rounding bar, for instance between the cross sectional portions along line I-I and II-II, further shown in detail in FIGS. 4B and 4C and described below, are causing a series of changes in the axis of rotation 18a, 18b, 18c, 18d resulting in a substantial change in the overall axis of rotation as the portion of semi solid medium 1 is acted upon by the variable contour rounding bar 12.

As the axis are changed, the non-contact area 3n of each portion for each axis will be moved or changed and come into contact with rounding surfaces, allowing the non-contact area 3n created at the previous axis to be effectively rounded. This change in the axis of rotation will also shift where the triple point of contact between the semi solid medium portion 1, the conveyor belt 5 and the variable contour rounding bar 12, is located. As the axis of rotation continually changes throughout the length of travel in relation to the variable contour rounding bar 12, the blemish point 3p that starts to form and the non-contact area 3n due to any given axis will be moved and rounded into the rounded portion at the next change in the axis of rotation 18a, 18b, 18c, 18d, so as to almost eliminate the propagation or opportunity to form blemish 3p or non-rounded area or section 3n.

It is the substantial change in the axis of rotation 18a, 18b, 18c, 18d imparted on the semi-solid material that results in the improved rounding. In the exemplary embodiment a non-limiting example of a typical substantial change in the angle of the axis of rotation can be of or about degree greater than two degrees, more typically of or about five or greater degrees in the change of the angle being realized. The substantial change in the axis of rotation facilitates the rounding forces and working forces imparted on the portion such that the unworked areas from the first axis of rotation are worked upon when rotating about the second axis of rotation and the like throughout the number of changes in the axis of rotation so as to round the semi-solid material portion i.e. no area of the material portion is left unworked. Similarly, blemished areas or areas showing signs of blemishing on the first axis of rotation are further moved in such a way that they are more likely to be worked or reworked. The overall result being over the course of the working area all of the surface areas of the semi-solid material portion are worked by coming into contact with the rounding bar or the conveyor belt and result in an improved rounding process.

With the multiple semi solid medium portions 1 shown in FIG. 4A, they are spaced along the path of the variable contour rounding bar 12, it may be seen in the FIGS. 4A-8 that depending on where a semi solid medium portion 1 is along the variable contour rounding bar 12 and in what area of the rounding contour of the variable contour rounding bar 12 it is in, that this will determine its axis of orientation which changes throughout the length of the variable contour rounding bar 12 based on these variations in the contour. As shown the substantial change in axis of rotation 18a, 18b, 18c, 18d is accompanied by changes in the rounding contour profile and action being imparted at the various positions along the rounding bar 12, which results in a complete rounding of the material portion 1.

When the semi solid medium portion 1 is at the entry 17a, an axis of rotation of 18a is initially 0 imparted and rounding begins. Proceeding along the rounding contour, the semi solid material portion 1 impacts a compression area 13a in the profile of the variable contour rounding bar 12 and it imparts an axis of rotation 18b for the compression area 13a. As the portion proceeds in its movement, it is processed at a relaxed area 13b of rounding contour of variable contour rounding bar 12 and imparted with an axis of rotation 18c. And as the portion 1 reaches the exit area 17c, a final change to the axis of rotation 18d is imparted. These are just some of the possible axis of rotation changes as the forming or deforming velocity vectors imparted by the collision or mechanical deformation of the semi solid medium portion 1 with the contour of the variable contour rounding bar 12 at each section are tailored to the material and varied to produce specific results. For instance, in the non-limiting example shown, the rounding forces of section 13a are not the same as those imparted by the contour of section 13b and are suited to a specific mechanical working force on the portion. Some examples of the mechanical working forces induced include but are not limited to compression, containment, relaxation or release and the like. Thus the at least one variable contour rounding bar 12 imparts at least one change in the axis of rotation 18a, 18b, 18c, 18d of the dough or semi-solid portion along the working length of the at least one variable contour rounding bar 12.

This overcomes many of the major issues with prior art devices. It provides for more controlled and consistent rounding. The instant invention may also adjust variables, such as the angles of deflection and inclination, 4a and 4c respectively, and tilt angle 4b, being the angle from horizontal of conveyor belt 5 in direction of travel 5a. Further, the significant changing of the axis of rotation or rounding can be the basis of a particular profile so that it works to specifically alleviate the triple point blemish 3p mark and the unworked area or non-deformation portion 3n discussed in relation to FIG. 2 that are persistent issues in prior art devices utilizing the continuous contour bars. By continually changing this axis of rotation, for instance from 18a to 18d, in FIG. 4 and the second rounding bars in FIG. 7, the chance of such a blemish in the portions rounded by the instant invention will be greatly reduced.

The instant invention also allows for different working force types and techniques to be tailored on the non-consistent or varying contour or profile rounding bar 12, allowing for specific controlled and consistent results. The changes in the varying contour of the varying contour rounding bar 12 can include for example, but are certainly not limited to, variables related to the material being worked upon, specific working forces desired, or to provide a desired number of axis of rotation changes in a given distance as just some non-limiting examples. The varying contour rounding bar 12 can be made to also be easily changed on a particular device to suit the desired dough or semi solid material and the rounding to be performed, for example, a particular varied contour for tortilla portion rounding versus a varied contour for pizza dough rounding.

For instance, the frequency and degree of changes in the variable contour can be specific to the working forces desired. As noted in FIG. 4a, the pitch or distance between where the contour of the non-uniform contour section 13a repeats, however this can be varied, so as to stay at constant intervals or at constant pitch or at longer or shorter periods of compression. It is also noted that the magnitude of the work that may be imparted on the semi solid medium portion 1 may not always be constant and that it can diminish as the semi solid medium portion 1 passes along the length of the variable contour rounding bar 12 based on profile variable changes. This is important because as the semi solid medium portion 1 gets worked it may need less forming or deforming work imparted to it as it is becoming substantially more rounded as it passes along the length of the variable contour rounding bar 12. Therefore it can be that to provide better rounding that the best procedure would be to reduce the magnitude of the work imparted on the semi solid material portion 1 as the semi solid material portion 1 passes along the length of the variable contour rounding bar 12 and the degree and frequency of changes in the varying profile can be developed to suit this. This can also vary as between different types of semi solid material, for instance different types of dough and even different end shapes for the dough, e.g. loaf size portion versus buns size portion and the like.

Figure 4C:
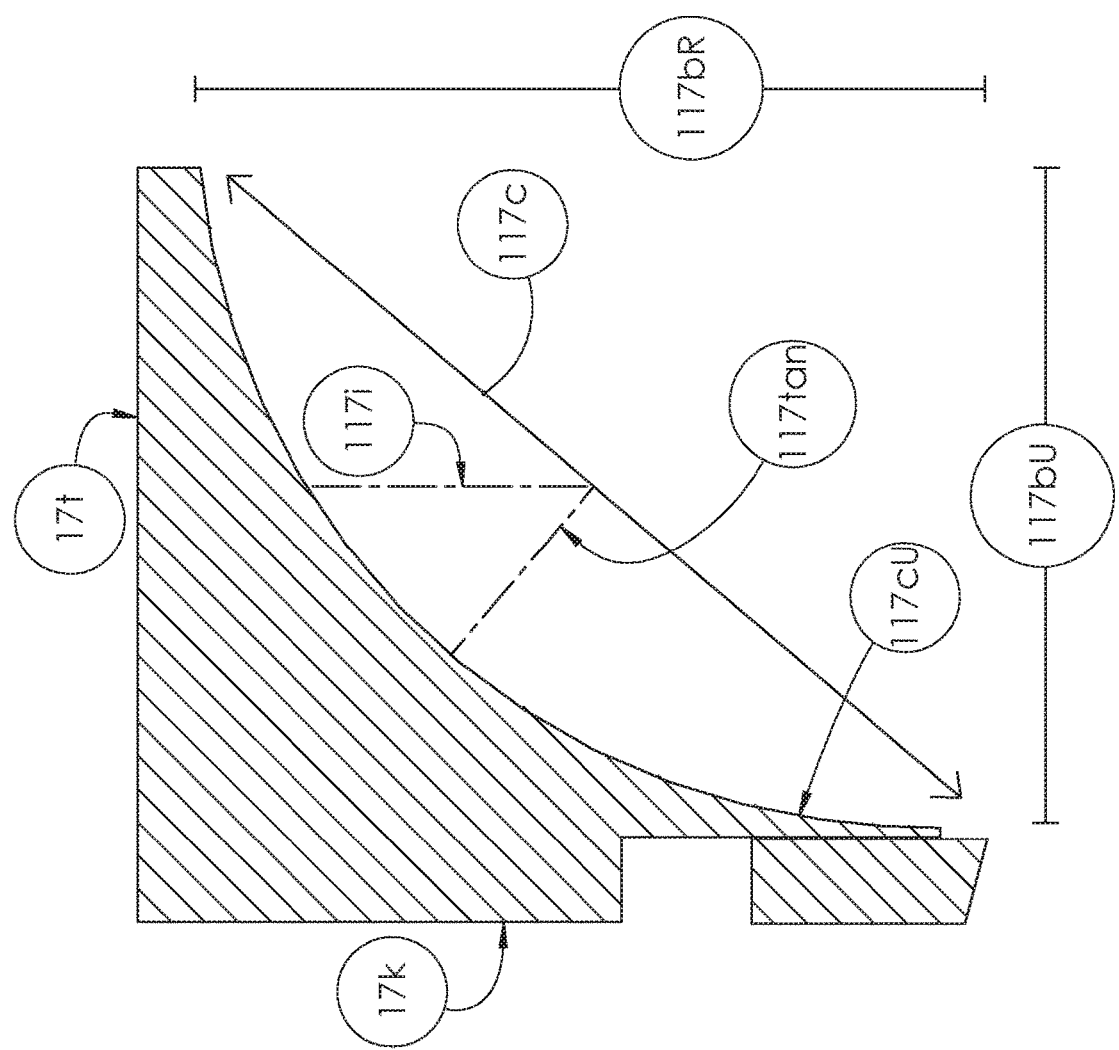

FIGS. 4B and 4C show cross-sectional view of the variable contour bar of the exemplary embodiment of the invention shown in FIG. 4A. The parameters of the contour, as noted, may be varied to suit the material as it is worked and may change as between material characteristics, product types, and similar variables. The contours provided are non-limiting examples to show such variation in the profiles. As seen in the contours of FIGS. 4B and 4C, 4B shows a cross-section of 13a, a compression area in the variable contour or profile of the variable contour rounding bar 12 along cross-section I-I. As noted and indicated in FIG. 4A, this contour repeats intermittently along the working length of the variable contour rounding bar 12. Though specific reference is made to the contours and contour elements in FIGS. 4B and 4C it is understood that these are non-limiting exemplary embodiments of a variable contour in a variable contour rounding bar. Though particular angles, radii and other elements defining the curve of the contour or profile at a given cross section are shown, these vary along the length of the variable contour rounding bar and can be varied in and of themselves. For example, the contour may be comprised of simple, uniform, complex or compound curves with a variety of radii or constant radii, as suits the particular desired working forces imparted by that section of the variable contour rounding bar.

The variable contour of the rounding bar can comprise one or more changes in the shape of the contour which promotes the semi-solid material to change orientation during its rolling so it processes through at least one change in its axis of rotation along the working area. The change in the shape of the variable contour can be defined by changes in at least one of radius, arc, long chord length, curvature, concavity, convexity, degree of curvature, pitch, points of tangency, points of reversal in curvature, lip height, roof length, wall height, tapering, pitch, bearing distance and the like. These variables include dimensions relating to the geometry of the cross-sectional profile and the open area that it defines within the working area. For rounding, the contoured cross-section profile is defined by a curved surface and the radius is a radius of the curved shape. The contoured shape can be shaped with a complex curve with more than one radius defining the shape, with each radius associated with a different arc that defines a portion of the curved profile that is associated with the working surface. That is, the arc defines a portion of the curved surface that is defined by a particular radius.

Additional variables of curvature or curves can be varied. For instance, when the long chord length of the curvature of the contour is taken as the x-axis for the curved shape and a point of reversal in the curve, that is the point on the curve when the slope switches from positive to negative or a zero point representing a change in the direction of curvature, a reversal line can be described as a line that intersects the reversal point and that is perpendicular to the long chord length, where the curvature is in one direction to one side and another direction to the other side of the reversal line. The length, shape, positioning and the like of this line and the chord length, can for instance, vary and describe the variations in the curve.

The contour can be a complex curve. The complex curve need not be entirely concave, the curvature of the contour can include dips and changes between being concave and convex or even flat, representing a complex compound curve. For instance, a convex dip in the roof surface can help to hold the semi-solid material portion in conjunction with the movement of the conveyor belt against the back of the rounding bar and prevent the semi-solid material portion from being squeezed out, away from the back wall. Accordingly, concavity and convexity are characteristics of the contoured shape and the degree to which the surface is concave or convex changes how the semi-solid material portion is worked and can be varied accordingly. The lip height is the distance between a front most edge or lip and the top surface of the rounding bar and can likewise be varied alone or with the roof length is the length of the roof portion of the curve that extends from the back portion or wall to the edge.

Other variables relate to the varying shape of the working area rounding surface along the linear length from the entry area to the exit area. A non-limiting example of this is tapering that can relate to the change in the curvature along the length of the working area for transitioning from one shape to another shape, with longer tapering distances associated with gentler, smoother shape transitions and shorter tapering distances being indicative of more abrupt transitions or openings. Another example of a variable along the length of the working area is pitch, a measure of a helical curvature or distance and how it changes along a length. These and other variables of note are explained throughout the specification and can be applied to a given exemplary embodiment.

Unlike rounding bars that are currently in use, which have a constant shape for the entire length of the working area, by using a variable contour like those in the non-limiting examples of FIGS. 4A-8, semi-solid material portions are subjected to different forces when subjected to a different profile shape and these changes in forces and where these forces are applied have the effect of substantially changing the axis of rotation so as to round the previously unrounded and any blemished areas. The number of changes in the axis of rotation is determined by the number of shape changes in the variable contour. Instead of relying upon random changes in the axis of rotation by transferring the semi-solid material portions from one rounder bar to another rounder bar, which also adds to the required length for an inline rounding machine, a plurality of changes in the axis of rotation can be achieved within the working area of a single rounding bar with the instant invention. Also, because the semi-solid material remains in contact with the working surface as it rolls along its length, the changes in the axis of rotation can be more controlled, removing randomness from the process, which improves consistency in the product quality.

Referring to FIG. 4B, the contour of the variable contour rounding bar 12 is shown having a back outer portion 17*k* and a roof outer portion 17*t*. The inner portion or curve of the contour or profile of the variable contour rounding bar is defined with an internal portion height 17bR, an internal portion length 17bU, and a curved surface 17cU. The inner portion overall height 17bR is measured such that it is the height above the conveyor belt, the portion that extends up perpendicular to the surface of the conveyor belt 5. The inner portion overall length or roof, that portion that extends parallel to the conveyor belt from the side of back portion 17k of the curved interior to the lip or front of the rounding bar 19, is shown as 17bU. A further major chord length 17c is provided to define the curvature of the curved surface 17cU at a starting point of the curve and the end point of the curve of the contour. The curve is further defined by a line extending perpendicularly to the major cord 17c and intersecting a point of reversal in the curve, the reversal line 17tan, which defines the depth of the curve at a point of reversal and the maximum radial length in this example. Radii 17i and 17ii further define the curve of the contour at the cross section, where 17i and 17ii are unequal radii to the left and right of the point of reversal respectively. This makes the contour of this section a complex or compound curve. The decreasing radii, 17ii being shorter than 17i, of the curve shown is indicative of a general flattening of the curve so as to exert a varying compressive force vector during movement through this area. Thus the height of the inner portion 17bR, the length of the inner portion 17bU, the major or long cord length 17c, the line of reversal 17tan, and radii 17i, 17ii are non-limiting examples of the variables that can be used to define the nature of the contour changes in the compression area 13a and the corresponding curvature as shown in FIG. 4A.

The lower height 17bR relative of the non-uniform curve of this compression area 13a relative to the entry area 17a generally reduces the cross sectional area of the space that the dough or semi-solid material is moved through resulting in compression of the dough in the compression area 13a. This can generally be referred to as a more closed contour or profile. The parameters shown are only descriptive of this non-limiting example. A number of variables can be changed to suit the desired forces or material for a given area on the variable contour rounding bar 12. Again, these variables can include but are certainly not limited to the radius, arc, long chord length, curvature, concavity, convexity, degree of curvature, points of tangency, points of reversal, lip height, roof length, wall height, degree of tapering, pitch, bearing distance, and like variables of the contour or profile which can be varied to create the desired rounding or working forces. Again, this is only a single cross-section of a varied contour profile, the nature of the invention provides for a number of changes based on the desired forces to work the particular dough or product in the rounding device. FIG. 4C shows a further section in a different area of the variable contour rounding bar 12 with a differing curvature as part of its contour.

FIG. 4C shows the further cross section of the relaxation area 13b of FIG. 4A. As seen when compared to the cross section shown in 4B, the curvature is changed significantly as is the height of the curve in the area. As seen in FIG. 4B, the back outer portion 17k and top outer portion 17t are shown. An overall interior height of the curve 117bR is shown. An interior length of the curve or contour 117bU is also provided. The interior curved portion is shown as 117cU. As shown, the height above the conveyor is greater in the cross section for relaxation area 13b than in cross-section of compression area 13a in FIG. 4B, generally indicating an opening, broadening, or relaxing curvature and therefore lessening the working and rounding forces exerted.

A similar reversal line 117tan is shown extending from the point of reversal of the curve and is shorter than the previous reversal line 17tan, conceptually a shallower curve, with the major chord length 117c being longer, as is apparent in FIG. 4C than the corresponding major chord length 17c of FIG. 4B. The curve is further defined by a radius of curvature 117i that is consistent throughout the curve. This curve or contour is much more open and is therefore consistent with the relaxation of forces imparted in the relaxation area 13b as shown in FIG. 4A.

The contoured shapes shown in FIGS. 4B and 4C are only specific cross-sections of a varied contour profile, and a number of changes can be made based upon the desired forces to work a particular dough or other semi-solid material portion. The illustrated shapes are described as being associated with the application of a compressive force and a relaxation of forces, but the function of these shapes depends upon the shapes that are in the adjoining segment. For example the shape in FIG. 4B is described as one that applied as compressive force but if the adjoining segment has an even smaller open cross-section then the shape shown in FIG. 4B could act to relax the compressive forces acting on the semi-solid material portion.

Further, compressive and relaxation forces are only two descriptions of the types of forces that can be applied to the semi-solid material portion. While there usually is some amount of compressive force other forces can be more dominant and more aptly associated with the applied forces. For example, in addition to compression and relaxation some other descriptors for examples of the mechanical working forces that can be induced by other shapes include but are not limited to kneading, containment and release. What is similar is that within the working area there are changes in the shape of the contours so that there is at least one change in shape so that the semi-solid material portion changes its axis of rotation at least once within the rounding area.

These variations result in necessary changes in the rotational axis 18b,18c,18d as noted in FIG. 4A and impart the rounding and forming or working forces associated with the compression area 13a and the relaxation area 13b. As noted, the rounding profile or contour is varied along the length of the rounding bar, but the pattern of changes and the variation of the non-consistent profile or contour can be used to further improve the work being performed by the rounding bar on a particular semi solid material or dough. Such that, not only is the rounding improved by the changes in axis of the portion, but the portion is further worked on, e.g. kneaded or worked in a baking sense, as it is moved through these variations.

Thus, the variations in profiles not only facilitate improved rounding but they can change for the material and the need to work the material as well as round it into a finished, rounded semi solid material or dough portion. By inspection one can also see at the very least that differing sizes of semi viscous portions will need different non-consistent contour profiles sized to match the size of the semi solid material portion. If the contour is too large or too small then the semi solid portion may not contact the profile properly. Too small a contour and, in many cases, to the extent that the portion overfills the non consistent contour at a given position on the bar, the semi viscous material will have deforming or unwanted forming forces exerted upon it through compression action or forces being exerted, resulting in blemishes or other undesirable results.

The contour variables can be varied to suit material variables of the semi solid medium portions and the manner in which the contour or profile of the variable contour rounding bar 12 is varied to impart specific forming and rounding forces to suit particular materials characteristics. These can include for instance, but are certainly not limited to, the degree of viscosity as well as type of viscosity and the Newtonian characteristics of the material engaging the variable contour rounding bar 12, as noted previously a variety of doughs exhibit these differencing physical characteristics which effect roundability. Thus, as a further non limiting example of how the desired profile can be configured to fit a specifically required or desired set of forces at different points on the rounding bar, take the non-limiting example of a stiff dough which will typically require a greater degree of deformation to achieve the better rounded shape and therefore may have several compression areas. This is based in part on the greater viscous nature of the medium. By comparison a softer or less viscous medium will flow more easily and therefore need less deformation so as to deform and round and therefore fewer compression areas. These material variables and variables like them are also integral in the shapes and contours of the non-consistent or variable contour or profiles and the variation of the contour along the length of the variable contour rounding bar 12 for that particular material.

A yet further non-limiting example of a medium viscosity material that would require several compression areas would be for a portion of panko bread which is stiff but mixed for a shorter period of time than stiffer doughs such as bagels and some pizza doughs, so that significant deformation is required so as to move the viscous material so that the sharp or non rounded surfaces of the "as cut" portion can be rounded into round or a spherical shape. By comparison a soft, low viscous material portion such as soft white bread dough can be more easily rounded as in many cases just the rotational contact of the soft white dough against the contour will get it to deform and round in a desirable fashion and into a desirable spherical shape.

Another non-limiting example of a material variable that can influence the changes in the non-consistent contour along the rounding bar includes the type of fluid characteristics which can play a role in working and rounding. This being in reference to if the semi viscous material is of a Newtonian or non Newtonian material classification as discussed at length above. A non-limiting example of a semi-solid material that exhibits Newtonian Fluid characteristics would be a bagel or pizza dough, where the dough is stiffer due to lower water content than in a soft white bread dough but with a good degree of mixing and where the dough tends to go from a medium viscosity that has little tensile strength or bond to where it is better "developed" in the baking/dough sense. When a small amount of the well mixed or developed dough is pulled it will stretch as compared to a dough that has received a small degree of mixing and development such as but not limited to dough for scones where the scone dough when pulled on will have little to no stretch and merely tear or crack. The stiffer dough that is developed, in the baking sense, will stretch and will also exhibit a non-Newtonian fluid characteristic, so that when you start to deform the stiffer dough it will stiffen to resist deforming initially and will to a degree soften or become elastic when the deforming action is stopped. These types of doughs would need a greater degree of compression or deformation so as to first overcome the stiffness resistance to deformation and then an additional degree of deformation required again so as to overcome the Non-Newtonian fluid resistance to rounding forces as to in the end provide a rounding effect so as to round the non-round edges of the dough portion.

By comparison a muffin dough such as that used to create English muffins is a very soft dough and it is significantly mixed so as to be well developed. When an English muffin dough is worked upon so as to be rounded it is so soft that it is easy to round with very little deformation and the non Newtonian effect is slight because of the high water content and softness of the dough. Thus, each non-consistent profile can be tuned to specific dough characteristics and not only work the dough but provide improved rounding of the dough or semi solid material for that particular material characteristic. The instant invention provides for tailoring of the non-consistent or varied profile or contour of the rounding bar varied to suit particular material types and characteristics, including easy release guides and adjustment mechanisms as discussed in relation to FIG. 8 herein below.

Figure 5:
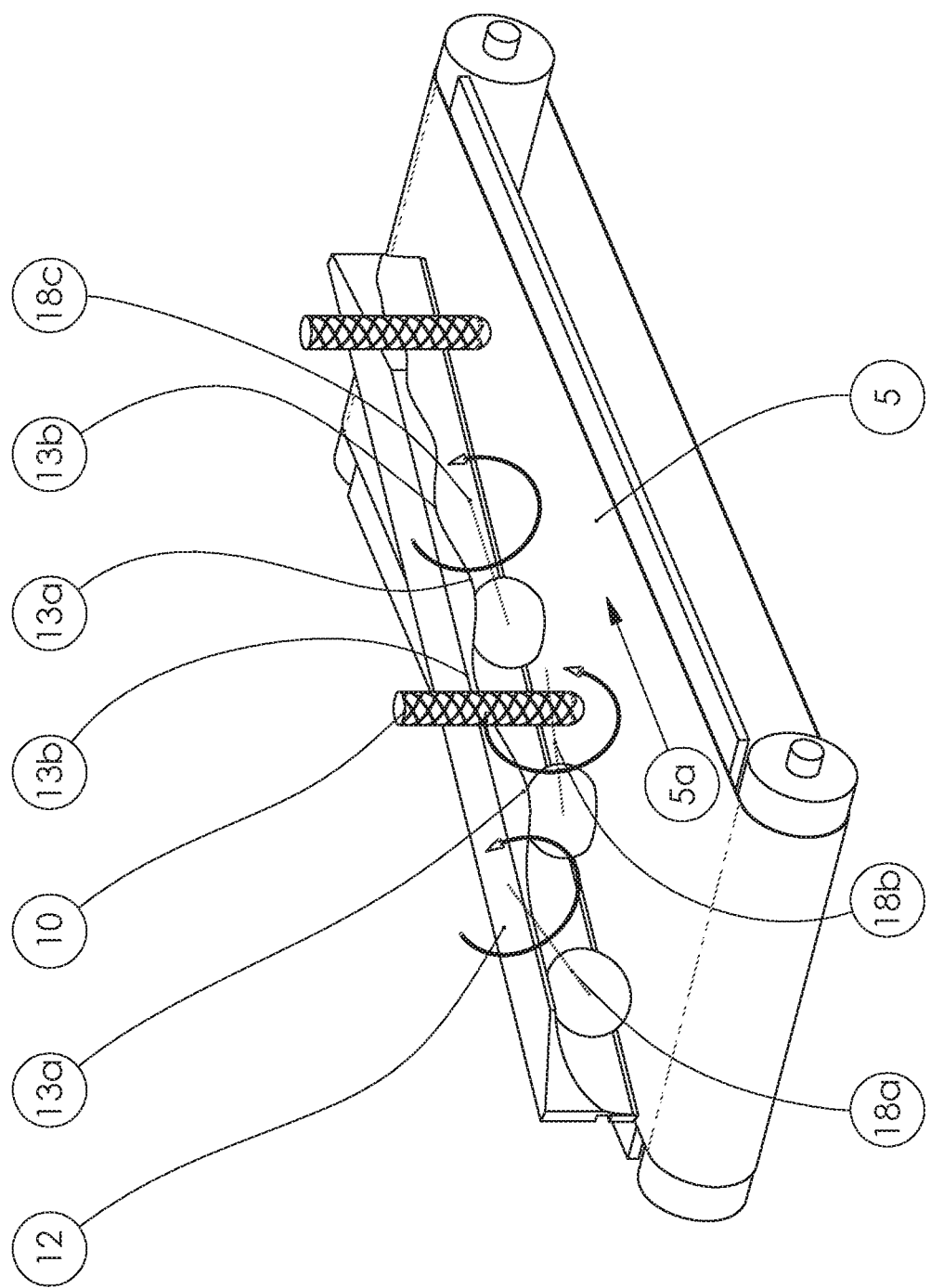
FIG. 5 shows a further isometric view of another exemplary embodiment of the invention having a variable contour rounding bar with rigidly mounted collision rods.

FIG. 5 shows a further isometric view of another exemplary embodiment of the invention having a variable contour rounding bar with rigidly mounted collision rods. The further exemplary embodiment of the invention is shown having a variable contour rounding bar 12 with rigidly mounted collision rods or rods 10 which are placed in the path of the semi solid medium portion 1 as well as being placed in a significantly open area of a rounding contour relaxed area 13b where it allows for release of the semi solid material portion 1 so as to allow for a change in rotation and or to spin the top portion of the rotating semi solid medium portion backwards so as to more significantly alter the rotation axis of the semi solid medium portion 1. Placing the collision rod 10 in such an open area as 13b would increase the rate of change of axis of rotation 18b. The collision rods 10 can thus be used to add or increase the change in axis of rotation of the semi solid portion.

It may also be the case that the open area of the contour 13b may be too long or utilize to much of the variable contour rounding bar 12 so as to either require extending the length of the variable contour rounding bar 12 and conveyor bed 6 and conveyor belt 5 to provide the desired full effect of the variable contour rounding bar 12 to produce the optimal rounding of the semi solid medium portion 1. In this case the addition of the collision rod 10 would increase the rate of change in axis of rotation 18c to allow for a reduced length of rounding contour relaxed area 13b of variable contour rounding bar 12 therefore increasing its efficiency and reducing the overall length of the rounding conveyor 5 and variable contour rounding bar 12. This collision in an opening part of the contour may impart a small amount of movement into the resulting axis of rotation of the portion being worked. This movement works together with the additional changes exerted on the semi-solid material portion when it becomes entrained along the further part of the variable contour rounding bar via the non-consistent or variable contour. In fact it is the variations and certain open contours of the variable contoured rounding bar 12 that allows for utilization of such collision rods in and along the contour rounding bar 12 and then the entrainment of the portion along a different profile or contour.

Figure 6:
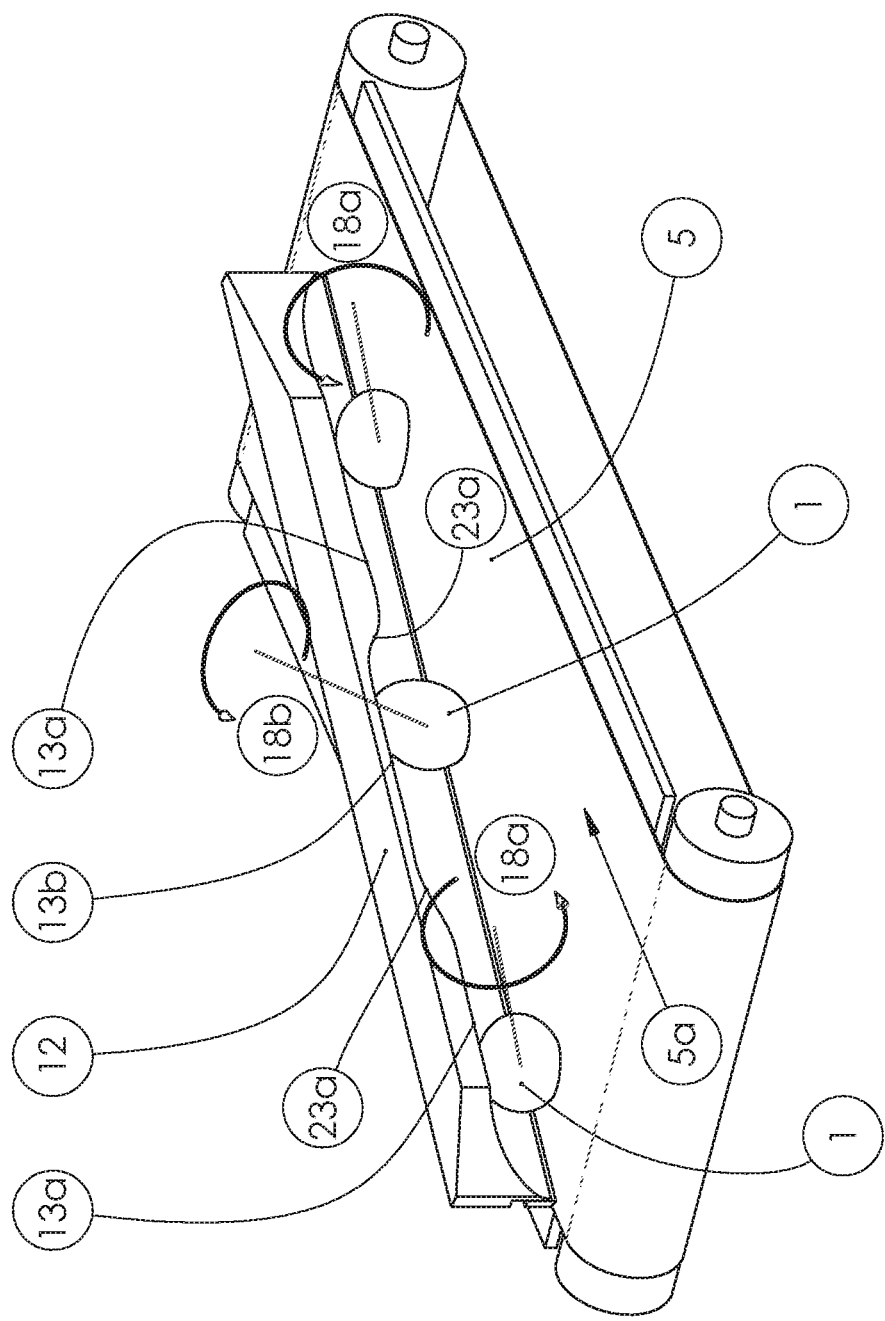
FIG. 6 shows yet a further isometric view of a further exemplary embodiment of the non-continuous contour rounding bar where tapered opening profiles have been made within the rounding bar.

FIG. 6 shows yet a further isometric view of a further exemplary embodiment of the non-continuous contour rounding bar where tapered opening profiles have been made within the rounding bar. The variable contour rounding bar 12 is shown having compression sections 13a rapid expansion openings or transition or tapers 23a to the rounding contour relaxed section 13b, similar to a square waveform, within the rounding bar 12 that change the rounding forces from a rounding compression area 13a through the rapid expansion openings 23a to a rounding contour relaxed or in this case the release area 13b but in a stepped manner rather than using continuously varying curves. These rapid expansion transitions 23a will allow for a constrained release period where the semi solid medium portion 1 will be able to have a greater change in axis of rotation before again being put into or reengaged in a lower or tighter contour or profile so as to again apply greater forming forces.

This greater change in the axis of rotation can occur without the use of a collision rod. Though it is readily understood by one of ordinary skill in the art that it is also the case that if one needs a longer compression forces area 13a then the variable contour rounding bar 12 with the rapid expansion transitions 23a indicated can shorten the rounding contour relaxed area 13b with the addition of a collision rod 10 so as to rotate the portion and or change the axis of rotation in as short a distance as possible and allow for as long a compression area 13a as possible, as previously suggested in relation to FIG. 5. That is the exemplary embodiment of FIG. 6 does not exclude the use of such rods.

The rapid expansion transition 23a into the opening 13b can be rounded or sculpted in this transition section, not necessarily sharp, but exhibiting a rapid rise by comparison to a longer smooth or gentle rise viz-a-vis tapering. The compression area 13a can also be lengthened to provide a greater degree or length of compression forces for the required rounding purposes for the semi solid medium portion 1. Also the rounding contour relaxed area 13b can be increased to allow for greater rotation or change of axis of rotation during relaxation. As well the rounding contour sections could contain other changes in section or curvature so as to not have or avoid effectively having a continuous contour rounding section where a triple point blemish 3p as in FIG. 2 could occur. This illustrates the improvements in changing from a continuous contour to a variable contour rounding bar 12.

Figure 7:
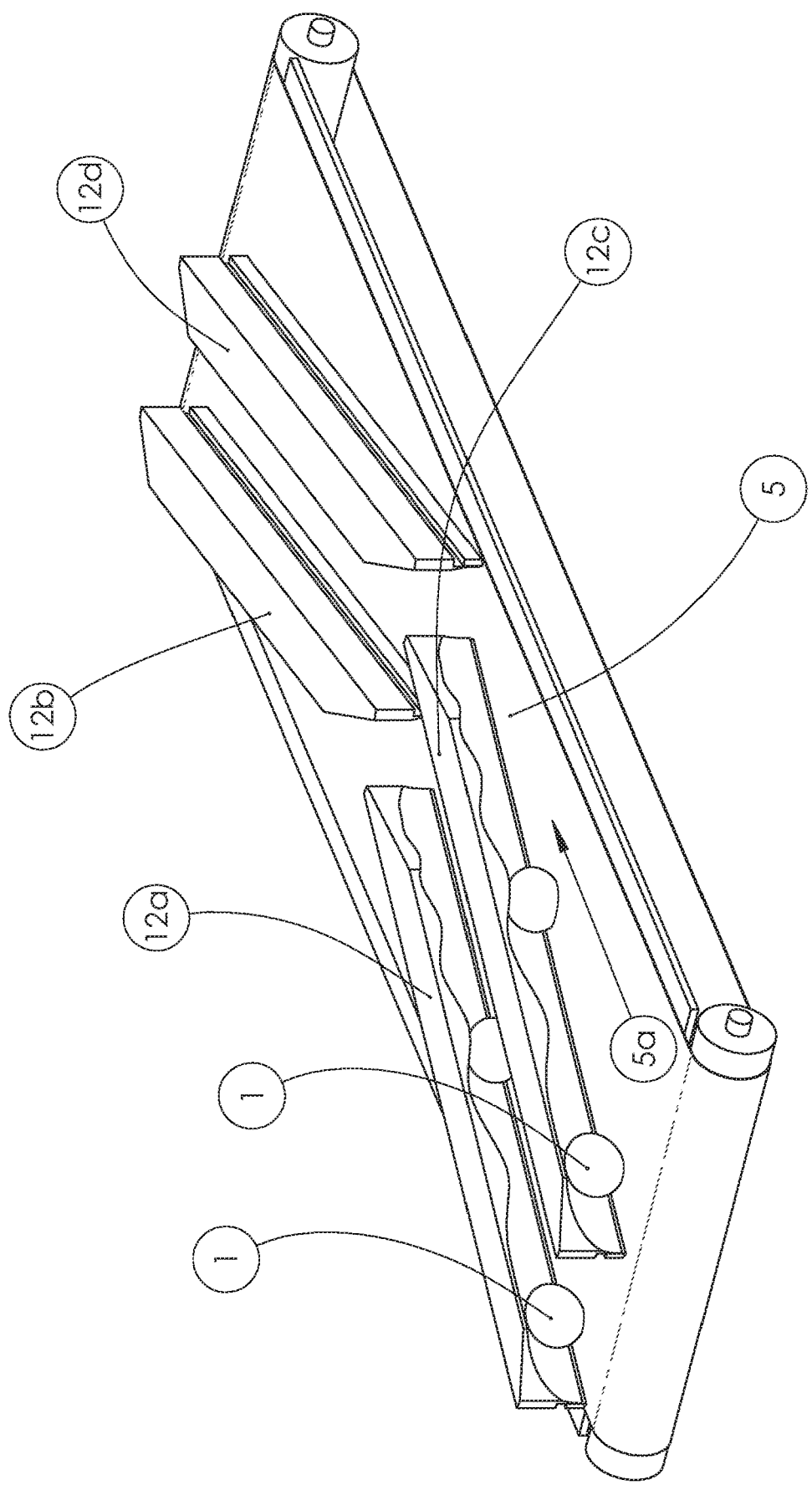
FIG. 7 shows a further isometric view of a further exemplary embodiment of the variable contour rounding shoe where there are two lanes with two variable contour rounding bars in succession.

FIG. 7 shows a further isometric view of a further exemplary embodiment of the variable contour rounding shoe where there are two lanes with two variable contour rounding bars in succession. The first variable contour rounding bar 12 going in an diagonal angle of left to right and the second variable contour rounding bar 12b being reverse and going from right to left. This is repeated in a second "lane" of rounding bars with rounding bar 12c and 12d. That is there are two identical "lanes" comprised of variable contour rounding bars 12, 12b with 12 being followed by 12b and the further set of variable contour rounding bar 12c, 12d with 12c being followed by 12d, respectively. It should be noted, that although two lanes are shown, the number of lanes in the instant invention may be varied and can include single lane versions providing the reversal from one variable contour rounding bar to a further variable contour rounding or more than two sets of lanes.

In each instance a set of rounding bars are used where the first variable contour rounding bar 12, 12c is placed at an angle of deflection 4a relative to the direction of travel 5a of the conveyor belt 5 and these are followed with a second set of rounding bars 12b, 12d going in the opposite direction and angle. This allows for the semi solid medium portions 1 to be received and rounded and exit the first variable contour rounding bar 12, 12c and be recaptured by the entry area of the second reversed set of variable contour rounding bars 12b, 12d for subsequent further rounding. Again, although the non-consistent rounding bar of the instant invention sufficiently translates the semi solid medium portion 1 or dough portion and changes the axis of rotation along the length of the variable contour rounding bar, the use of a second similar non-consistent profile or variable contour rounding bar allows for further working of the portion with only minimal variability in the results of the rounding.

Figure 8:
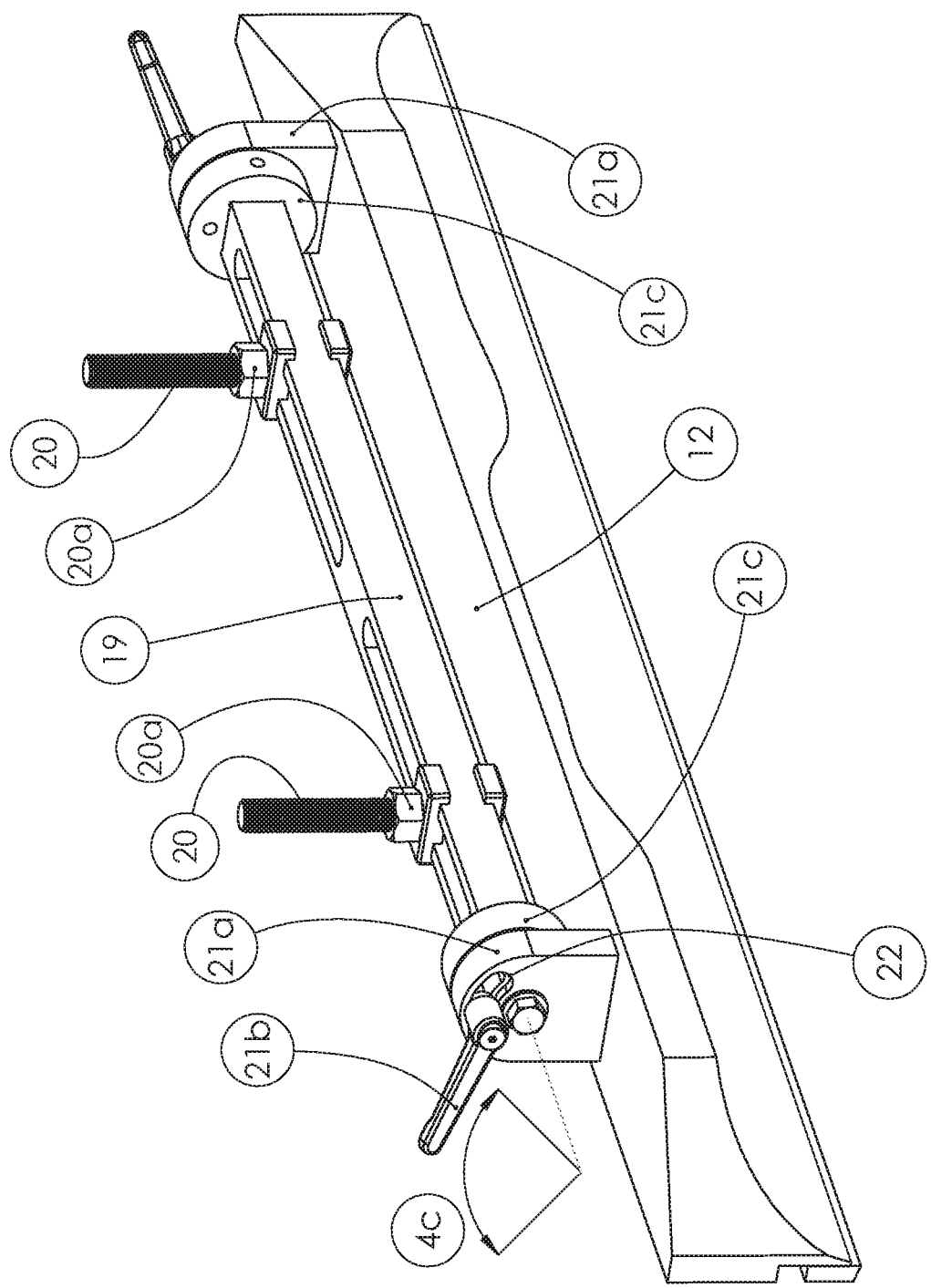
FIG. 8 shows an isometric view of the invention which also includes an adjustment so as to be able to adjust the rotation imparted by the non-consistent profile rounding bar.

FIG. 8 shows an isometric view of the invention which also includes an adjustment so as to be able to adjust the rotation imparted by the variable contour rounding bar. A variable contour rounding bar 12 is shown with a mounting bar 19 and attachment rods 20 so as to affix the mounting bar 19 to an overhead structure for support. The mounting bar 19 is affixed to a support structure (not shown) with attachment rods 20 which are releasably mounted to the mounting bar with releasable connectors 20a, here shown with a non limiting example of screw clamps. This allows for the removal of the variable contour rounding bar 12 for another variable contour rounding bar with a differing contour or length which may be suited to a different product or a need for differing rounding bar functions.

Also shown is a rotation block 21a mounted to the variable contoured rounding bar 12 with clamping handle 21b and rotating element 21c coupled thereto, so as to be able to rotate and releasably clamp said variable contour rounding bar 12 at a range of inclination angles 4c. The inclination angle 4c is shown with arrows to indicate this freedom of movement and it is yet a further adjustable angle that the variable contour rounding bar 12 can make to the conveyor belt 5. Inclination angle 4c can be adjusted so as to impart differing rounding characteristic to the semi solid medium portion 1 so as to best round the semi solid medium portion 1. The rotation blocks 21a permit rotation of the variable contour rounding bar 12 through a variety of inclination angles 4c as the clamping handles 21b are movable in and along the length of the adjustment slots 22.

Description of an Exemplary Method of Operation of an Exemplary Embodiment

Reference is made to the method of operation and use of the exemplary embodiments of the instant invention as enumerated above. Semi solid medium portions are created by separating portions from a bulk semi solid medium through the use of a portioning machine. The semi solid medium portions are fed onto the moving conveyor belts so that once placed on the moving conveyor belt the semi solid medium portion travels to a rounding bar entry area and impacts the at least one variable contour rounding bar at the entry area. The non-consistent or variable contour or profile rounding bar is set at an angle of deflection on the horizontal relative to the direction of travel of the conveyor belt. The variable contour rounding bar is also set at an angle of inclination relative to a plane perpendicular on the vertical relative to the conveyor belt. The angle of deflection 4a can be set for example at about between 0 and 45 degrees but most typically at an angle of about 5 to 20 degrees. The tilt angle 4b can be set for example at about between −30 and 30 degrees, but most typically at an angle of −5 to 10 degrees. The angle of inclination 4c can be set at about between −25 and 45 degrees but typically at an angle of about 0 to 15 degrees and provides the required amount of deformation, rounding, or deformation and rounding.

The semi solid medium portion approaches the at least one variable contour rounding bar at the rounding bar entry area and progresses toward the variable contour rounding bar working areas along the majority of the length of the rounding bar. The dough or semi-solid material portion strikes the back side, upper area, or both the backside and upper area of the variable contour rounding bar. The deposited dough or semi solid medium portion will start to rotate along the surfaces of the variable contour or profile of the rounding bar upon contact.

The non-consistent or variable contour rounding bar and the moving lower conveyor belt impart the working forces, e.g. compression and relaxation, on the semi-solid or dough portion as well as rounding forces. The varying contour or profile of the variable profile rounding bar is presented at an orientation based on the angle of inclination, angle of tilt or tilt angle, and angle of deflection across the path of travel of the conveyor belt such that the resulting cross sectional area of the contour of the variable contour rounding bar at that orientation and with the shape of the particular variable contour in that area to impart the forces on the semi-solid material and round the semi-solid material or dough. Additionally, the change in the forces from the change in contour at the release section will also promote a substantial change in the axis of rotation so as to progress from a first to a second axis of rotation to provide further rounding of unrounded, unworked areas on the semi-solid material portion.

The basis of the forces derives from the driving force moving in the direction of travel of the conveyor belt upon the semi-solid material which is translated into a rounding force from the contact with the variable contour rounding bar having multiple vectors based on this contact. These vectors, as discussed above, may be influenced by a number of variables in the contour and are non-consistent or variable throughout various portions of the length of the rounding bar. These vectors and the changes in the vectors can also be planned based on variables of the material to affect certain forces to work the dough and impart working forces, typically compression forces or relaxation/expansion in a given area and provide specific rounding for a semi-solid material type.

The portion is moved at an at least one of rotation along the variable contour rounding bar. In an exemplary method of operation, the dough portion is moved along the entrance at a first axis of rotation through to a first area of an at least two areas of the variable contour rounding bar having a first contour at which the portion is rotated at a further axis of rotation. The portion is moved further along the length of the variable contour rounding bar through a rapid expansion transition into a second of an at least two areas and rotates at further axis of rotation. Finally it is passed out of the exit area at a final axis of rotation. This process may be modified to incorporate additional changes in profile and axis of rotation based on profile or material variables or profile and material variables or the desired working forces, rounding forces, and working and rounding forces. After exiting it may be further processed by additional rounding or by other devices.

The semi solid portion is thus moved along the length of the at least one variable contour rounding bar and engaged through semi-solid portion or dough working forces which are, for example, at least one of reformed, deformed, and compressed while working the dough and rounded through rotation or rounding forces on an at least one axis of rotation with an at least one change of the at least one axis of rotation within the working length of the at least one variable contour rounding bar. The semi solid medium portion is thereby worked and rounded as it is passed along and through the working area of the at least one variable contour rounding bar by the moving conveyor belt and variable contour rounding bar set at a given orientation with an angle of inclination and angle of deflection.

Though reference is made to a single conveyor belt, the invention may be used on multiple conveyor units or "lanes" to increase production, as needed in the method of production. To provide additional rounding or working of the surfaces of the semi solid medium portion, as noted in the further exemplary embodiments, a change in rotation or axis of rotation may be further enhanced by collision posts, further rounding bars, openings and the items noted above so that each and all surfaces of the semi solid medium portion come in contact with the surface or surfaces of the at least one variable contour rounding bar and moving conveyor belt to provide for rounding forces and working forces. This provides a more complete rounding of the dough portion and thereby eliminates the majority of non-rounded surfaces as well as eliminating blemishes that can occur to the finished dough portion. This method improves efficiency, reduces waste, reduces the size of the machine and provides a better finished product than the prior art.

By comparison, one of several shortcomings with the standard consistent contour rounding bar device methods of operation is that once the semi solid medium portion comes in contact with the rounding bar and is deformed and rounded by the contour of the consistent contour rounding bar such that the semi solid medium portion will rotate about a single, constant axis of rotation and once it has made two to four rotations on this constant axis of rotation it will receive little to no further rounding of the semi solid medium portion. Any area that does not get rounded as it does not contact a moving or rounding surface of the rounding contour or the moving belt on the axis of rotation will not get rounded by duplication of or further rotation about the constant axis of rotation in subsequent rotations. The semi solid medium portion 1 will be non-uniformly rounded as it does not change this axis of rotation and thus will maintain any or all non-rounded surface areas not in contact with the rounding bar by the axis of rotation.

There is also a detriment to having or maintaining rotation of the semi solid medium portion on a constant axis of rotation in that it results in blemishes in the surface of the semi solid medium portion 1 which may develop in addition to the blemishes or non-rounded surfaces that could not be removed in rounding with the consistent axis of rotation. If the semi solid medium portion 1 were to continue on this rounding path there comes a point where further rounding provides a detrimental aspect where it takes the semi solid medium portion 1 and due to the consistent axis of rotation the rounding portion will receive blemish lines and blemishes to it from continuous compressed contact with the edge of the rounding bar 9 and the semi solid medium portion 1. Although duplication of the prior art consistent rounding bar in series can result in a change of the axis of rotation, the number and nature of these changes is deficient to achieve meaningful improvements.

Simply dropping from one constant profiled rounding bar to another provides only a single change in the axis of rotation, and not on the same rounding bar. This change occurring only during transition from the first rounding bar to the further second rounding bar and in an uncontrolled, random fashion. Moreover, after dropping to the second of the constant profile rounding bars the rounding forces still maintain a single axis of rotation for the length of the constant profile rounding bar. Meaning, to achieve the same coverage as the instant invention in the changes of axis and rounding areas, the reversal or drop must occur several times, increasing the length of the resulting production line and the number of rounding bars and still likely resulting in blemishes from overly lengthy rotation on a single axis of rotation, which includes the potential return of navel shaped blemishes as the duration of the turns on the unchanging single axis of rotation would result in a higher propensity of these types of blemishes. The instant invention avoids this and shortens the distance required to deliver improved results.

The method of the instant invention is further distinguished from the previous horizontal inline devices methods of operation in that it provides for additional rounding of all surfaces of the semi solid medium portion as it changes the rotation or axis of rotation in the working area length of the at least one variable contour rounding bar. Additional surfaces of the semi solid medium portion in the instant invention can come into contact with the surface or surfaces of the variable or non-consistent rounding bar and moving conveyor belt. By creating a series of open and closed varying contours, for instance, along the length of the in the non-consistent or variable rounding bar, the instant invention results in a shorter length device that provides multiple, varied axis of rotation of the semi solid medium portion.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below in light of the understanding of one of ordinary skill in the art at the time of the invention, not this summary alone. The subject matter should be understood by reference to appropriate portions of the entire specification of this patent, any or all drawings and each claim.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A semi-solid media rounding device transporting and rounding an at least one semi-solid material portion, comprising:
    an at least one conveyor belt mounted to and moving above a conveyor bed in a direction of travel;
    an at least one variable contour rounding bar coupled to a frame and aligned above the conveyor belt, the at least one variable contour rounding bar having:
        an entry area,
        an exit area,
        a variable contour on the at least one variable contour rounding bar between the entry area and exit area, the variable contour being non-uniform along a first of at least two working areas on a working length of the at least one variable contour rounding bar rounding the at least one semi-solid material portion followed by an at least one rapid expansion transition on the variable contour proceeding to a release section that releases the at least one semi-solid material portion and changes a first axis of rotation of at least two axes of rotation to a second axis of rotation of the at least two axes of rotation of the at least one semi-solid portion before again being engaged with a second working area of the at least two working areas in the working length of the variable contour rounding bar.

2. The rounding device of claim 1, wherein said variable contour on the variable contour rounding bar having the first and second of the at least two working areas further comprises a plurality of working areas greater than two working areas in the at least two working areas.

3. The rounding device of claim 2, wherein said variable contour further comprises a plurality of rapid expansion transitions and each of the plurality of rapid expansion transitions followed by a further relaxation area within said working length separating the plurality of working areas.

4. The rounding device of claim of 1, wherein the at least one rapid expansion transition to the release section within the variable contour of the at least one variable contour rounding bar comprises multiple rapid expansion transitions each followed by release section and each release section imparting changes in the second axis of rotation to a third or more axes of rotation in the at least two axes of rotation in the semi-solid portion along the working length of the variable contour rounding bar.

5. The rounding device of claim of 1, wherein the at least one rapid expansion transition on the variable contour releases the semi-solid material portion from working forces while constraining it against the variable contour rounding bar and changing the axes of rotation while preventing uncontrolled rolling.

6. The rounding device of claim of 1, wherein the at least one variable contour rounding bar forms an angle of deflection relative to the direction of travel.

7. The rounding device of claim 6, wherein the angle of deflection is adjustable.

8. The rounding device of claim of 1, at least one variable contour rounding bar forms an angle of inclination relative to the at least one conveyor belt.

9. The rounding device of claim of 8, wherein the angle of inclination is adjustable.

10. The rounding device of claim 1, wherein the rounding device further comprises an at least one attachment element coupled to the frame and having an at least one mounting bar which is coupled to and supports the at least one variable contour rounding bar.

11. The rounding device of claim 10, wherein the at least one attachment element releasably couples the at least one mounting bar to the at least one variable contoured rounding bar in the rounding device.

12. A method of rounding semi-solid material portions on a variable contour rounding bar having a variable contour, comprising the method steps of:
    propelling an at least one metered semi-solid material portion on a moving surface;
    engaging the at least one metered semi-solid material portion to impact into the variable contour rounding bar such that the at least one semi-solid material portion is moved along the variable contour which is non-uniform along a first of at least two working areas on a working length of the at least one variable contour rounding bar and rounds the at least one metered semi-solid material portion followed by an at least one rapid expansion transition to a release section that releases the at least one metered semi-solid material portion and changes a first axis of rotation of at least two axes of rotation to a second axis of rotation of at least two axes of rotation of the at least one metered semi-solid portion before again being engaged within a second working area of at least two working areas in the working length of the variable contour rounding bar; and rounding the semi-solid portion into a rounded semi-solid portion as it exits from an exit area of the variable contour rounding bar.

13. The method of claim 12, wherein the method step of engaging the semi-solid portion to impact into the variable contour further comprises impacting the semi-solid portion with the first of the at least two working areas on the working length of the at least one variable contour rounding bar to form at least one compression semi-solid or dough working force in a compression portion of the variable contour ahead of the at least one rapid expansion transition with the release section that rapidly transitions and releases the at least one semi-solid material portion from working forces and changes the first axis of rotation of the at least two axes of rotation to the second axis of rotation of the at least two axes of rotation of the at least one semi-solid portion.

14. The method of claim 13, wherein the method step engaging the semi-solid portion to impact into the variable contour further comprises the step of impacting the semi-solid portion with the second of the at least two working areas on a working length of the at least one variable contour rounding bar following the release section imparting either an at least one relaxation semi-solid or dough working force in a relaxation portion of the variable contour of the at least one variable contour rounding bar or a further compression semi-solid or dough working force in a compression portion of the variable contour in the second of the at least two working areas.

15. The method of claim 13, wherein the step of engaging the semi-solid portion to impact into the variable contour and impacting the semi-solid portion with the first of the at least two working areas on the working length of the at least one variable contour rounding bar to form the at least one compression semi-solid or dough working force further comprises a variable contour that tapers in the compression portion.

16. The method of claim 13, wherein the step of engaging the semi-solid material portion to impact into the variable contour rounding bar such that the first axis of rotation of the at least two axes of rotation is changed to the second axis of rotation of the at least two axes of rotation as imparted on the semi-solid material portion at the release section that releases the at least one semi-solid material portion further comprises further rounding the metered semi-solid portion by rolling about the second axis of rotation such that a non-contact area of said semi-solid portion that was not in contact with said rounding bar when said at least one metered semi-solid portion was moving about said first axis of rotation is oriented to be in contact with the rounding bar, said conveyor belt, or said rounding bar and said conveyor belt when said semi-solid material portion is rolling about the second axis of rotation.

17. A variable contour rounding bar having a variable contour that receives portioned pieces of a semi-solid material for rounding, said variable contour rounding bar comprising:
   an entry area;
   a rounding area that receives said portioned pieces of semi-solid material which are propelled against the variable contour rounding bar from said entry area, imparting a first axis of rotation of at least two axes of rotation, and the variable contour of the variable contour rounding bar imparting at least one rounding force on the portioned pieces of semi-solid material at a first of at least two positions along a working length of the at least one variable contour rounding bar;
   an at least one rapid transition followed by a release section that opens to release the portioned pieces and allows the portioned piece to rotate from the first axis of the at least two axes of rotation to a second axis of the at least two axes of rotation;
   a further rounding area that receives said portioned pieces of semi-solid material which are propelled against the variable contour rounding bar from said at least one rapid transition section and through the release section that follows the at last one rapid transition section, the propulsion of the pieces of semi-solid material working on the second axis of rotation of the at least two axes of rotation in the further rounding area; and
   an exit area receiving the pieces of semi-solid material from the further rounding area and releasing the pieces of semi-solid material from the variable contour rounding bar.

18. The rounding bar of claim 17, wherein said rotation of the portioned pieces from the first axis of the at least two axes of rotation to the second of the at least two axes of rotation is imparted upon the semi-solid material pieces such that a non-rounded portion of the semi-solid material piece becomes rounded along the length of the variable contour rounder bar in the further rounding area.

19. The rounding bar of claim 17, wherein said variable contour rounding bar further comprises an at least one still further rounding area and an at least one further release section that imparts a further change of the axes of rotation of the at least two axes of rotation imparted upon the semisolid material pieces before it passes to the at least one still further rounding area such that a further non-rounded portion of the semi-solid material piece becomes rounded along the length of the variable contour rounder bar.

20. The rounding bar of claim 17, wherein each of the rounding areas separated by the at least one rapidly changing transition section has a change in the variable contour from a first rolling section to a further rolling section and an abrupt cessation of the at least one rounding force occurring in the release section that follows the at least one rapidly changing transition section.

* * * * *